United States Patent [19]
Noonen et al.

[11] Patent Number: 5,926,208
[45] Date of Patent: *Jul. 20, 1999

[54] VIDEO COMPRESSION AND DECOMPRESSION ARRANGEMENT HAVING RECONFIGURABLE CAMERA AND LOW-BANDWIDTH TRANSMISSION CAPABILITY

[76] Inventors: Michael Noonen, 900 High School Way #2309, Mountain View, Calif. 94041; Kevin Deierling, 26731 Taafe Rd., Los Altos Hills, Calif. 94022; Keith Barraclough, 610 Gilbert Ave., #23, Menlo Park, Calif. 94025; Bryan R. Martin, 580 Sobrato Dr., Campbell, Calif. 95088

[*] Notice: This patent is subject to a terminal disclaimer.

[21] Appl. No.: 08/708,184

[22] Filed: Sep. 6, 1996

Related U.S. Application Data

[63] Continuation-in-part of application No. 08/457,516, May 31, 1995, abandoned, and application No. 09/098,106, Jun. 16, 1998, which is a continuation of application No. 09/005,053, Jan. 9, 1998, which is a continuation-in-part of application No. 08/908,826, Aug. 8, 1997, Pat. No. 5,790,712, which is a continuation of application No. 08/658,917, May 31, 1996, abandoned, which is a continuation of application No. 07/303,973, Sep. 9, 1994, abandoned, which is a continuation of application No. 07/838,382, Feb. 19, 1992, Pat. No. 5,379,351.

[51] Int. Cl.$^6$ .......................... H04N 7/14; H04M 11/00
[52] U.S. Cl. ........................ 348/17; 348/15; 379/93.08
[58] Field of Search ................ 348/14–18, 207, 348/213; 379/202, 93.08, 93.21, 100.17, 93.01; 358/426, 432; 382/236, 276

[56] References Cited

U.S. PATENT DOCUMENTS

| | | | |
|---|---|---|---|
| 5,121,221 | 6/1992 | Hamano et al. | 358/426 |
| 5,379,351 | 1/1995 | Fandrianto et al. | 382/236 |
| 5,448,310 | 9/1995 | Kopet et al. | 348/699 |
| 5,479,206 | 12/1995 | Ueno et al. | 348/213 |
| 5,524,265 | 6/1996 | Balmer et al. | 395/800.38 |
| 5,528,285 | 6/1996 | Morikawa et al. | 348/14 |
| 5,675,375 | 10/1997 | Riffee | 348/15 |

OTHER PUBLICATIONS

J. Fandrianto, et al. "A Programmable Solution for Standard Video Compression", Integrated Information Technology, Inc. article pp. 47–50. (1992).

D.Bailey, et al. "Programmable Vision Processor/Controller for Flexible Implementation of Current and Future Image Compression Standards", Integrated Information Technology, Inc. article, pp. 33–39 (Oct. 1992).

A Programmable Solution for Standard Video Compression, pp. 47–50, Fandrianto et al. 1992.

*Primary Examiner*—Curtis A. Kuntz
*Assistant Examiner*—George Eng

[57] ABSTRACT

A video and audio compression and decompression system includes a reconfigurable compact camera communicating with a computer system to permit the camera to execute one of several types of compression modules. The camera includes first and second types of memory. The first type of memory is made of smaller ROM-type memory cells and is used for storing computer-executable video-data-compression subprograms. The second type of memory is made of larger RAM-type memory cells and stores the compression program. A download circuit on the camera is configured to receive transmitted data representing the data compression program and to store the transmitted data in the second memory. A selection is made of the stored subprograms corresponding to the data representing the compression program. An image reader including a data generation circuit captures the external image and generates data representing the image. A processor executes the data representing the computer-executable program and the selected ones of the stored subprograms to generate compressed data, and the compressed data is transmitted from the camera.

7 Claims, 19 Drawing Sheets

VIDEO COMPRESSION AND DECOMPRESSION ARRANGEMENT HAVING RECONFIGURABLE CAMERA AND LOW-BANDWIDTH TRANSMISSION CAPABILITY

This is a continuation-in-part of U.S. patent application Ser. No. 08/457,516, filed on May 31, 1995, abandoned, (8X8S.16US01), and is also a continuation-in-part of U.S. patent application Ser. No. 09/098,106 (8X8S.051C1), filed on Jun. 16, 1998, which is a continuation of U.S. patent application Ser. No. 09/005,053 (8X8S.051US01), filed on Jan. 9, 1998, which is a continuation-in-part of U.S. patent application Ser. No. 08/908,826, filed on Aug. 8, 1997 (now U.S. Pat. No. 5,790,712), which is a continuation of U.S. patent application Ser. No. 08/658,917, filed on May 31, 1996 (now abandoned), which is a continuation of U.S. patent application Ser. No. 07/303,973, filed Sep. 9, 1994 (now abandoned), which is a continuation of U.S. patent application Ser. No. 07/838,382, filed Feb. 19, 1992, now U.S. Pat. No. 5,379,351, priority to which is claimed.

FIELD OF THE INVENTION

The present invention generally relates to digital capture and transmission of video images. More particularly, the present invention relates to a video-conferencing arrangement which is capable of using conventional low-bandwidth communication media to provide cost-effective and accurate transmission of digital video-image data.

BACKGROUND OF THE INVENTION

Video conferencing involves the capture and transfer of an image from a source location to a destination location. In most instances, video conferencing equipment is provided at both locations to permit the conferencees to see and hear each other as they are conferring in real time. In such applications, capturing the video images typically involves using a motion camera having a high-bandwidth output port which is used to transmit signals representing the captured images.

In terms of external appearance, such motion cameras can be similar to the cameras widely sold to consumers in retail stores. Both types are sufficiently compact in design to be portable or hand-held. Moreover, both types have a lens, a view finder, zoom controls, manual control switches and a signal output port. The signal output port on such motion cameras connects to a cable for carrying the output video signal to a display or editing equipment. Internally, however, the circuits used inside a video conferencing motion camera can be significantly different depending on the implementation used. The reasons for these differences are addressed below.

When using a motion camera for video conferencing, permitting the conferencees to see and hear each other in real time typically requires a special mechanism for transferring high volumes of digital data over the communication link (e.g., telephone line). In many real-time applications, the video images are of sufficient detail and/or quantity that the data representing the video images cannot be accurately transmitted by such conventional transmission media.

In view of this data-transmission concern, there have been various implementations attempting to overcome this problem.

One approach uses a relatively inexpensive low-bandwidth cable link between a conventional motion camera and an external computer system. This implementation uses a conventional hand-held camera having an analog VHF (television-type) signal-output port which provides analog data representing the captured video images to a conventional television-type input port to a computer system. The computer system then displays the received video information on a display monitor and, using a conventional or proprietary data-compression computer program, compresses the video image data before it is transmitted over a more conventional (low-bandwidth) communication link, such as a standard or upgraded telephone line. The compressed data is then received at the remote location and decompressed by another computer system using a decompression algorithm which corresponds to the previously-executed compression algorithm.

Another approach employs a relatively expensive high-bandwidth, data-communication link between the motion camera and an external computer system. In this implementation, unlike the conventional hand-held camera which includes an analog VHF (television-type) signal-output port, the motion camera includes a special interface circuit and signal output port which provides data representing the captured video images in digital form. The high-bandwidth, data-communication link then carries the digital video data to a specially-designed interface port and circuit in the computer system without causing significant degradation of the transmitted data. The computer system decodes the information for display, and then compresses the received video information for transmission over a conventional (low-bandwidth) communication link, as described above.

Yet another approach, which is useful in limited applications, involves discarding significant amounts of the captured digital video data (e.g., using a decimation algorithm) so that the data can be transmitted from the camera without requiring the expensive high-bandwidth communication link and associated interface circuitry. The applications for this approach are limited because discarding some of the captured video data results in an inaccurate reproduction (or display) of the video image at both the transmitting and the receiving ends of the video conference.

Such known video compression and decompression systems have experienced problems. For example, those implementations having specially-designed motion cameras use specifically-tailored hardware integrated circuits which require a burdensome amount of the limited real-estate available in such a motion camera. Further, widespread sales of such implementations are problematic because they are capable of operating with only one of the many types of available compression/decompression algorithms or they require a high-cost modification involving the addition of different peripheral items to accommodate the various compression standards. These standards include MPEG, MPEG1, MPEG2, JPEG, H.263, H.261, and Fractal, and there also are a number of other proprietary standards being used.

Yet another problem experienced by known video conferencing implementations is their need of various types of peripheral equipment to implement different image-capturing functions. For example, a system capable of handling the typical variety of applications typically includes the following items: a digital video camera for capturing full motion video; a digital still camera for capturing still pictures; a photo scanner; a black and white scanner; a business card scanner; a color scanner; a hand scanner; and a video capture card. The cost of such a system is further increased because these separate peripheral items often require their own unique interfaces to the computer system which interfaces with the telephone link.

Accordingly, there is a need for a cost-effective video-conferencing implementation that overcomes the above-discussed deficiencies.

SUMMARY OF THE INVENTION

The present invention overcomes the deficiencies of the prior art by providing a cost-effective video and audio compression and decompression system that produces high-quality compressed and decompressed video and audio in real-time, supports multiple video compression standards, and is capable of using a standardized interface to connect with a microprocessor.

In one embodiment, the present invention is directed to a system including a camera operative to receive one of a plurality of compression modules from a computer. The reconfigurable video-signal camera has first and second types of memory. The first type of memory is made of smaller ROM-type memory cells and is used for storing computer-executable video-data-compression subprograms; the second type of memory is made of larger RAM-type memory cells and stores the compression program. A download circuit in the camera is configured to receive transmitted data representing the data compression program and to store the transmitted data in the second memory. One of the stored subprograms corresponding to the data representing the compression program is selected for execution by the camera's computer. An image reader including a data generation circuit captures the external image and generates data representing the image. The data representing the computer-executable program is then accessed and executed along with selected ones of the stored subprograms to generate compressed data. A data transmission circuit responds to the processor means by transmitting the compressed data from the reconfigurable video-signal camera device.

BRIEF DESCRIPTION OF THE DRAWINGS

Other aspects and advantages of the present invention will become apparent upon reading the following detailed description and upon reference to the drawings in which.

DETAILED DESCRIPTION OF THE DRAWINGS

Figure 1A:
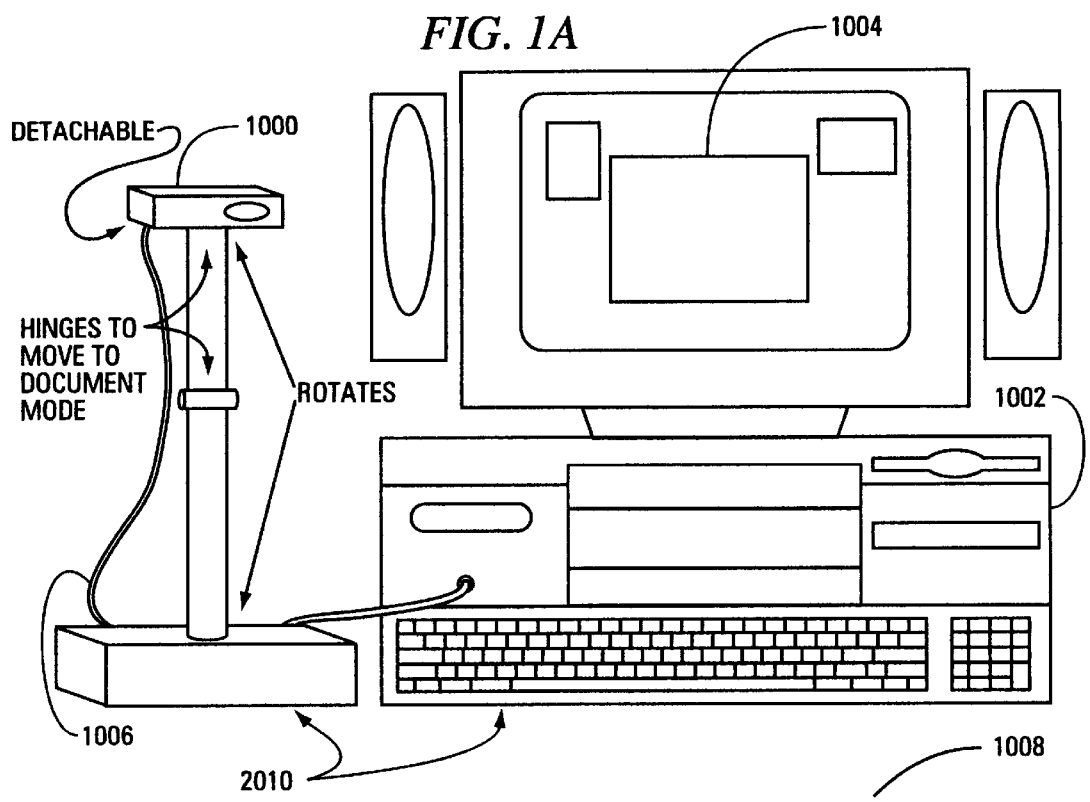
FIG. 1 is a graphical depiction of an embodiment of the present invention showing full teleconferencing.
Figure 1B:
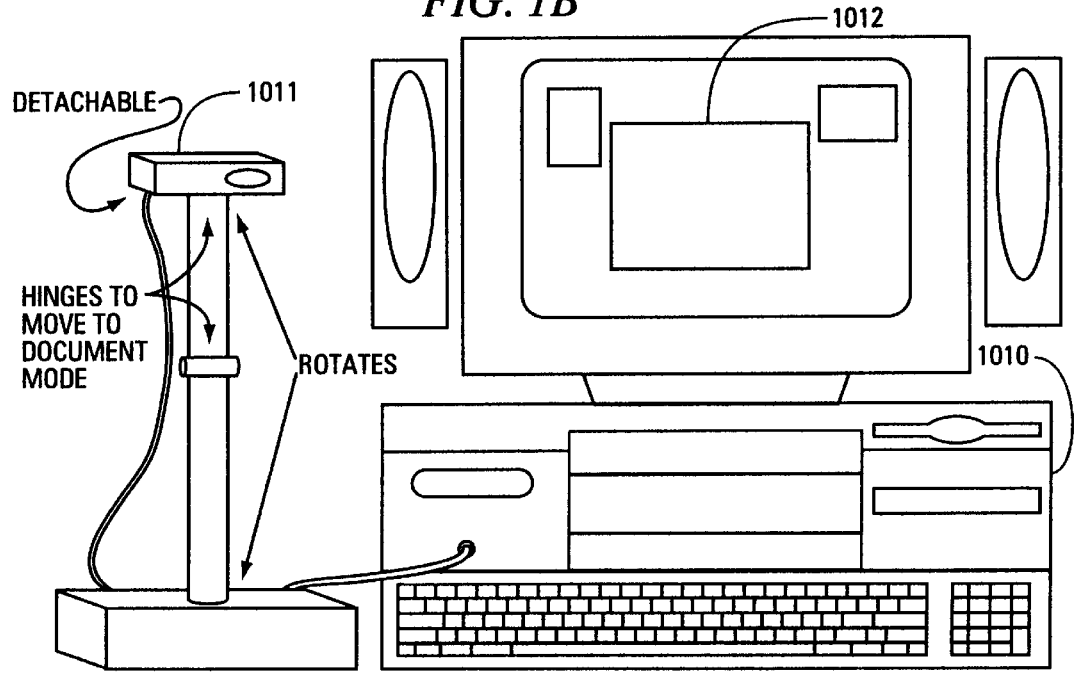

Turning now to the drawings, FIG. 1 is a system embodying the present invention. The system consists of a computer 1002 for storing multiple video and audio/video compression modules, e.g. MPEG, MPEG1, MPEG2, JPEG, H.320, H.324, etc. In this embodiment compression modules are sent to the video camera 1000 from the computer 1002 so that compression is done at the camera 1000. In an alternate embodiment, one of a plurality of compression modules is downloaded from an insertable cartridge appropriately affixed to the camera 1000 containing one of a plurality of compression modules. In either embodiment, compression of the video image data before transmission of the data to the computer system 1002 decreases the necessary bandwidth required for transmissions, thus allowing use of a standardized interface line 1006 instead of a costly specialized interface.

The user may select a compression module from a Windows-type environment on the computer screen 1004 and the computer will respond by sending that compression module via a low-bandwidth transmission line 1006, which is both standard and cost-effective, to the video camera 1000 for storage in and execution by the camera 1000. This transmission line is, for example, a Universal Serial Bus ("USB"), which is quickly becoming an industry standard and is well known in the art. The camera 1000 receives audio and video signals from the environment, compresses them, then sends them back along the low-bandwidth transmission line 1006 in compressed form to the computer 1002. At this point, the computer 1002 either decompresses the compressed image data or transmits the compressed signal via a standard phone cable 1008 or other transmission medium to a remote device, such as a remote computer system 1010. Subsequently, the remote device, in this case, remote computer system 1010 decompresses the compressed image and displays it on its own computer screen 1012. With the remote system operating in a similar fashion, full teleconferencing occurs between two sets of computer systems 1002, 1010 coupled to video cameras 1000, 1011 while maintaining cost-effective, low-bandwidth transmissions. Each computer system can be loaded with a plurality of compression modules such that one video camera can communicate with a wide range of other tele-conferencing systems.

Figure 2:
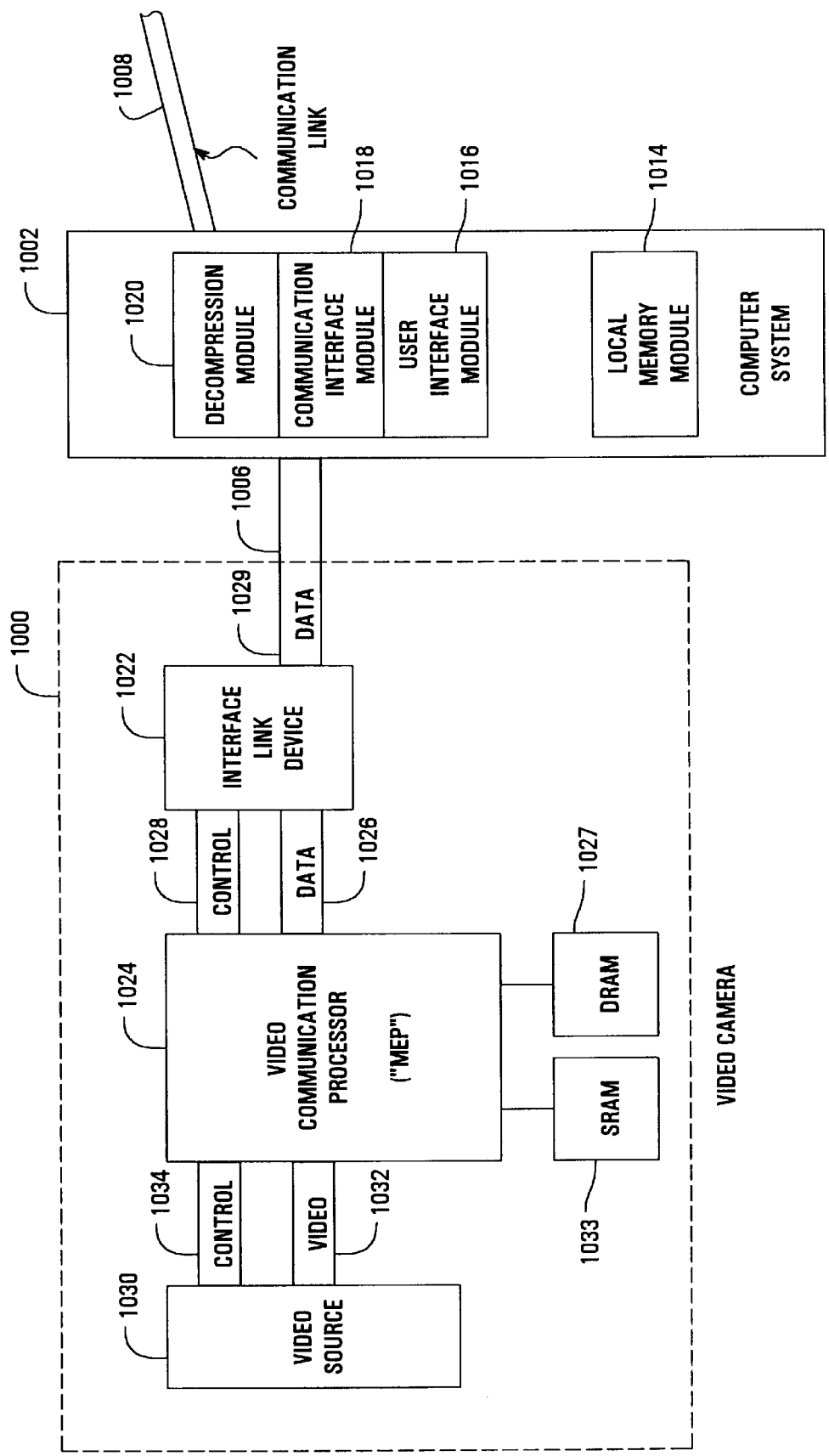
FIG. 2 is a block diagram of a video and audio compression and decompression system, according to the present invention, including a close-up of the video camera.

Referring now to FIG. 2, there is shown a more detailed description of the computer system 1002, the transmission line 1006 and the video camera 1000. The computer system comprises a user interface module 1016, a local memory module 1014, a communication interface module 1018, a decompression module 1020 and cost-effective, low-bandwidth transmission lines 1006 and 1008 for communication with the video camera 1000 and other teleconferencing systems 1010, respectively, all of which are coupled together by a standard internal system bus. The user interface module 1016 prompts the user, as shown in FIGS. 4 through 7, for an appropriate video compression standard. In one embodiment, the local memory module 1014 contains the various compression modules. The communication interface module 1018 manages communication links 1006 and 1008 for transmit and receive to both the video camera 1000 and outside world, e.g. 1010. The decompression module 1020 is used to decompress incoming compressed frames from either the video camera 1000 or the outside world, e.g. 1010. Transmission line 1008 may be, for example, a modem, an integrated system digital network ("ISDN") connection, a local area network ("LAN") connection, a cable modem, a cellular modem or a satellite connection.

Figure 3:
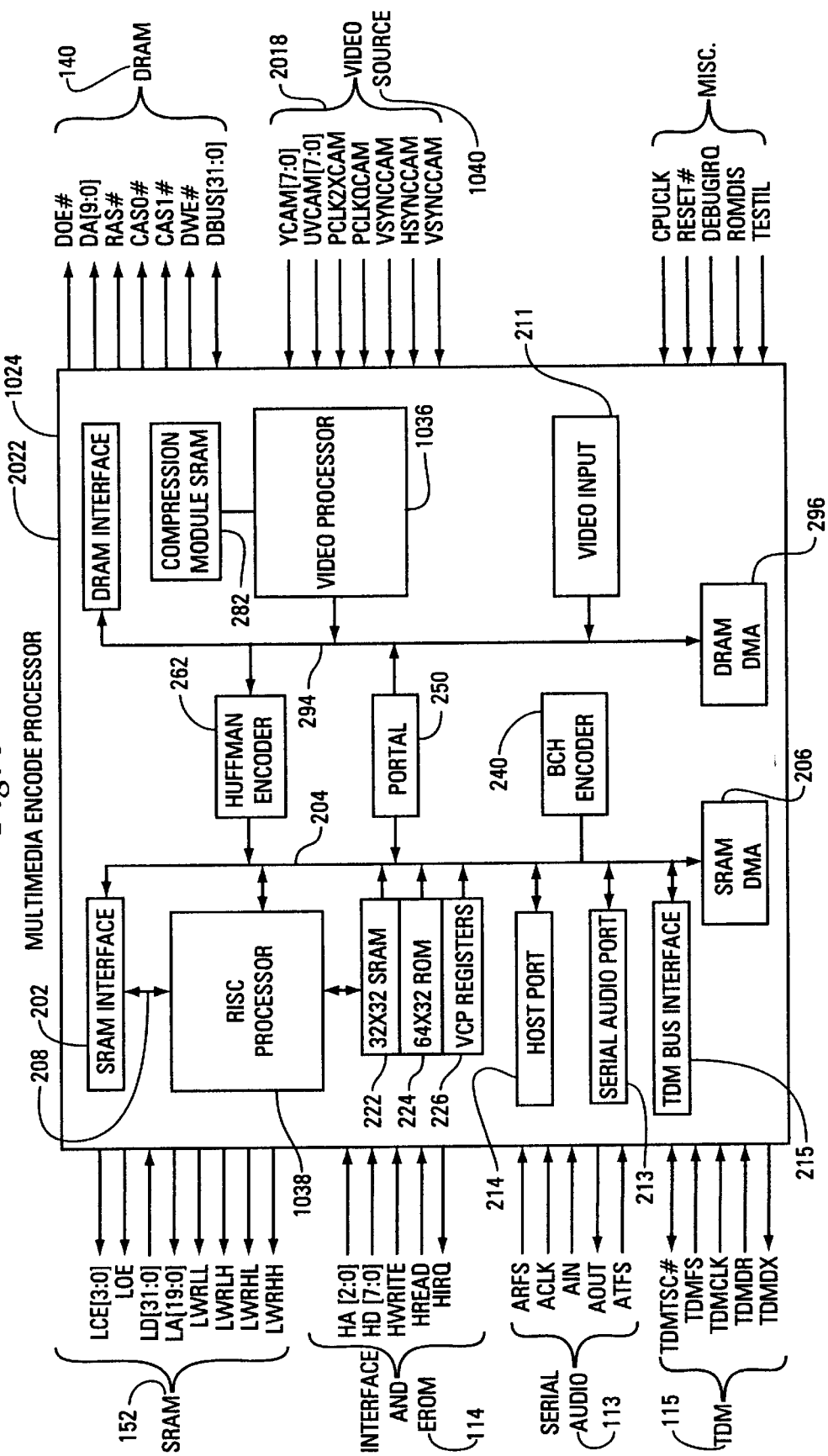
FIG. 3 is a block diagram of the video communication processor of FIG. 2.

The video camera 1000 comprises an interface link device 1022 coupled to the computer system via transmission line 1006, a video communication processor 1024, see FIG. 3, coupled to the interface link device 1022 via data lines 1026 and control lines 1028, a video source 1030 coupled to the video communication processor via video lines 1032 and control lines 1034. The video source 1030 is one of many known devices that receives a video image and digitizes it using one of many known methods. The interface link device 1022 manages communications with the computer system 1002 via the transmission line 1006, which can be implemented as a conventional USBBus, as show in FIGS. 8a through 8d. The compression camera may also optionally include a microphone and audio analog-to-digital converter (now shown) to acquire analog audio data, convert it to digital form, and send it to the MEP 1024 to be compressed.

The video communication processor, e.g., a Multimedia Encode Processor ("MEP") available from 8X8, Inc., Santa Clara, Calif., is coupled to main memories SRAM 1033 and DRAM 1027 and second memory 1031. This memory may be ROM, EPROM, EEPROM, flash EPROM or some other type of memory. One obstacle to downloading an entire compression module from the computer system 1002 to the MEP 1024 is the large magnitude of the compression module, requiring a large physical size of on-board memory. For example, the cells of a standard RAM chip are almost four times larger than the cells of a standard ROM. Therefore, to maintain the small physical size of the on-board memory but still allow a variety of different compression modules to be downloaded, two types of memory are used: the larger RAM type and the smaller ROM type. The larger memory is exemplified in FIG. 2 as, for example, an SRAM 1033 or DRAM 1027, and the smaller memory is exemplified in FIG. 2 as, for example, a ROM 1031. The first ROM memory stores subroutines, or subprograms, that are executed on an as-needed basis in connection with the execution of any one of the compression modules, which is downloaded into the RAM type memory. Because a ROM cell is about one-fourth the physical size of a RAM cell, the storage of these subprograms on ROM results in a significant savings in memory, and enables the video camera 1000 to execute one of a variety of compression programs downloaded to the camera without the burdens to camera size, extra equipment, real estate and cost associated with increased memory space.

In one exemplary embodiment, the MEP 1024 contains a second memory consisting of 8 KB of on-board RAM and a first memory consisting of 8 KB of on-board ROM. As addressed above, the on-board RAM is downloaded with the selected compression algorthim program. The subroutines stored in the ROM-type memory are those which may be executed by more than one compression algorithm program, including, for example: an initialization subroutine for initializing registers and variables; a background (or main control) routine which cyclically calls other subroutines (stored in RAM and ROM); a houskeeping routine which monitors and maintains the communication protocol such as how an incoming image is to be interpretted; debug routines for detecting and reporting operational and equipment errors; motion search routines which search for a block or blocks of pixels; subroutines for executing discrete cosine transform (DCT) functions; image coding loop routines used in conjunction with MPEG or H.263 compression algorithms; and data movement routines which are used to move blocks of data. In instances where firmware modifications are required or requested and the ROM is not readily modified, this arrangement permits selected compression algorthim programs to be altered before they are downloaded. Conversely, in situations where ROM is readily modified, e.g., with low camera volumes and/or use of EPROM, firmware changes can be made to ROM without having to modify already existing compression algorthim programs.

Use of the MEP 1024 to compress the image data is advantageous because it provides high quality compression and provides for higher frame rates and resolution of the played-back image than other video processors. Additionally, cost is reduced by combining a hardware encode using the MEP 1024 with a software decode using the decompression module 1020 accessed and executed by a processor of the computer system 1002 (shown in FIG. 17). Coupling the MEP 1024 to the camera 1000 instead of the computer system 1002 also saves silicon space on a processor of the computer system 1002. This results in lower processor manufacturing costs and increased processor efficiency.

Figure 2A:
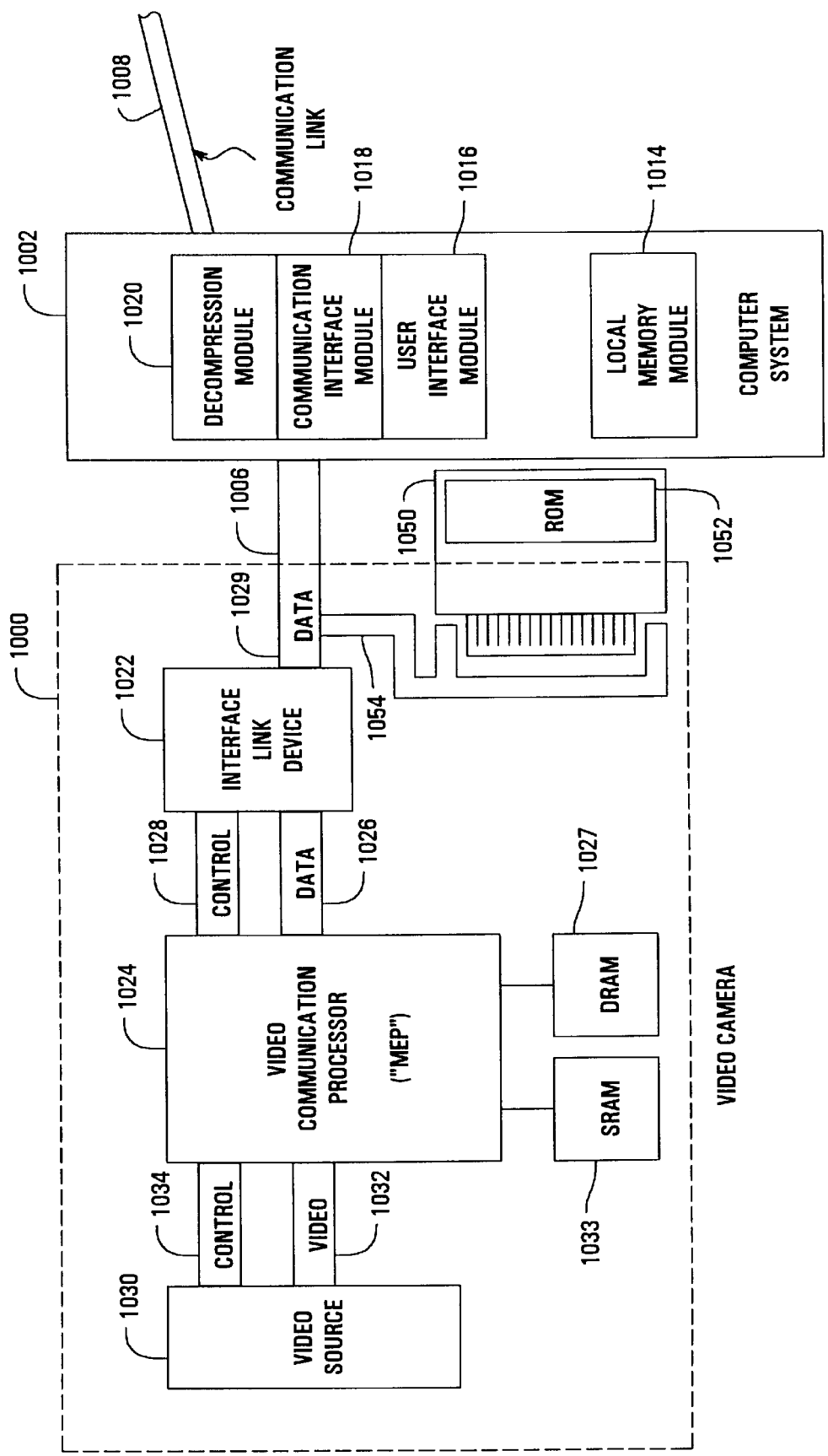
FIG. 2a is a block diagram of an alternate embodiment of the video and audio compression and decompression system of FIG. 2 showing use of a cartridge to download a video compression module.

An alternate embodiment of the system of FIG. 2 is disclosed in FIG. 2a. Functionally, the two are equivalent with the exception that an insertable cartridge is utilized that can serve a variety of purposes as described below.

In one implementation of this embodiment, the cartridge 1050 stores a compression program, thereby taking the place of the on-board larger RAM memory, 1027 or 1033. The MEP 1024 directly accesses the memory cells 1052, which can be many different types of memory cells, by connection 1054 thereby greatly reducing the amount of larger RAM memory needed on board the camera 1000. In this embodiment, the smaller ROM memory 1031 holds the subprograms of the compression algorithm.

In another implementation of this embodiment, the cartridge 1050 holds a compression program that is first downloaded to the larger RAM memory, 1027 or 1033, via connection 1054, then accessed therefrom by the MEP 1024. The smaller ROM memory 1031 again holds the subprograms of the compression algorithm. This allows for greater flexibility because the user can insert different cartridges for different compression algorithms, without requiring communication with the computer system 1002.

In another implementation of this embodiment, the cartridge 1050 holds both the compression program and the commonly used subprograms in its memory cells 1052. The MEP 1024 accesses the memory cells 1052 directly via connection 1054. The ROM type memory 1031 need not hold a copy of the commonly used subprograms. In this embodiment, the sizes of the on-board larger RAM type memory 1033 or 1027 and smaller ROM type memory are greatly reduced, thereby greatly reducing the size of the camera 1000.

In yet another implementation of this embodiment, the cartridge 1050 contains the compression program and the commonly used subprograms in its memory cells 1052. The compression program and subprograms are first downloaded via 1054 to on-board larger RAM memory 1033 or 1027 and then run therefrom. One disadvantage of this embodiment is that the larger RAM memory 1033 must be very large to house the entire compression algorithm, thereby greatly increasing the size of the camera 1000.

Referring now to FIG. 3, there is shown a detailed disclosure of the video communication processor 1024 known as the MEP comprising a video processor (VP) 1036, RISC processor 1038 and video source inputs 1040 from a video source 1030. The MEP 1024 is a single-chip programmable video codec and multimedia communications processor suitable for a variety of applications. The MEP requires only memory and interface circuits for implementation of a complete multimedia and conferencing subsystem. In one video conferencing application, the MEP acts as a full CIF (common interchange format) resolution, H.261 codec with forward error correction and audio/video bit stream multiplexing and demultiplexing according to the H.320 which includes the H.221, H.230, H.242, H.243, and H.261 digital communication standards described in recommendations from the CCITT (International Telegraph and Telephone Consultation Committee).

The MEP 1024 has several interfaces for input and output of audio, video, and other data. A video input interface 211 handles digital video signals and is connected via a video input bus 1040 to the video source 1030.

An audio interface 213 is for serial input and output of digital audio data. Audio interface 213 connects via a bus 113 to audio input/output devices such as a microphone and speaker (not shown).

An interface link port 214 and a TDM interface 215 handle output of compressed digital signals which represent video, audio, user defined, and other data. The interface link port 214 is for connection to the computer system 1002. The computer system 1002 transmits a compression module to, or receives compressed data from, MEP 1024 via the interface link port 114. The TDM interface 215 is a time division multiplexed interface for connection via a bus 115 to a modem and PSTN phone lines, ISDN lines, or devices such as CD-ROM drives which provide a time division multiplexed serial bit stream.

The MEP 1024 contains two main programmable processing units, a RISC processor 1038 and a video processor 1036, and processing resources 240 and 250 which perform specific processing tasks. With appropriate software, the MEP 1024 encodes video and audio data in compliance with H.261, MPEG 1, MPEG 2, JPEG or custom proprietary compression standards.

The RISC processor 1038 supervises hardware resources for input and output of compressed data, error correction and error correction coding, parsing bit streams, and interleaving audio and video data to form bit stream. The address space of the RISC processor 1038 includes an internal ROM 224, an external SRAM 152, an internal SRAM 222, VCP ("Video Communication Processor") registers 226, and a portal circuit 250. The internal ROM 224 contains a boot routine that the RISC microprocessor 1038 executes at start-up. The SRAM 152 contains program, data, and stack memory for the RISC processor 1038 and also provides memory for delay equalization FIFOs as described below. The internal SRAM 222 is for frequently used data which is accessed by RISC processor 1038 simultaneously with the loading of an instruction from SRAM 152 into RISC processor 1038.

The VCP registers 226 control operation of the hardware input, output, and processing resources and are distributed in the video processor 1036 and various hardware resources coupled to first and second data buses 204 and 294, respectively. The portal circuit 250 and a Huffman encoder 262 form a data path for data transfers between the first data bus 204 and the second data bus 294 which is used by the video processor 1036.

The video processor 1036 is a programmable signal processor which implements video coding procedures such as motion estimation, loop filters, discrete cosine transforms (DCTs), and quantization, and zigzag scanning as may be required by a software selected video protocol. In particular, the video processor 1036 executes software which performs video compression operations required by the MPEG, JPEG and H.261 standards as well as proprietary video compression processes. One embodiment of the video processor 1036 implements the instruction set VP5 listed in "VP Programmer's Manual," by Hedley Rainnie (revised by Daniel Helman) which is available from 8x8, Inc. and is incorporated by reference in its entirety.

The video processor 1036 compresses video data by executing software stored in the compression module SRAM 282. The RISC processor 1038 loads the software for the video processor 1036, from the computer system 1002, into the compression module SRAM 282 via the portal circuit 250 and a DMA controller 296. An external memory 140 provides a frame buffer for data being compressed. In one embodiment of the invention, the memory 140 is a 2 MByte DRAM.

The DMA controller 296 transfers uncompressed video data from the video input interface 211 to the memory 140 via the data bus 294 and a DRAM interface 292. After the video processor 1036 compresses video data using a protocol implemented in software, the DMA controller 296 transfers the compressed data from the memory 140 to the portal circuit 250 from which a DMA controller 206 or the RISC processor 1038 retrieves the compressed video data for weaving with audio data or otherwise for forming an output compressed bit stream.

The RISC processor 1038 and the video processor 1036 operate in parallel and have separate data paths, the second data bus 294 and the first data bus 204, which are interconnected by the portal circuit 250 and the Huffman encoder 262. The RISC processor 1038 supervises operation of the MEP 1024 including the DMA controllers 206 and 296 which are associated with the data buses 204 and 294.

The data bus 204 provides the RISC processor 1038 with a full 32-bit interface to the internal memories 222 and 224, the SRAM 152, and the VCP registers in resources coupled to the data bus 204. The SRAM 152 contains program, stack, and data storage for the RISC processor 1038 (and buffer storage for input and output data, bit stream framing, and video rate buffering as described below). An instruction data bus 208 allows the RISC processor 1038 to fetch an instruction from the SRAM 152 simultaneously with an access to an internal resource coupled to the first data bus 204. In particular, the SRAM 222 stores data which the RISC processor 1038 uses commonly, and access to the SRAM 222 is overlapped with the next instruction fetch to increase the number of instructions per second. The ROM 224 is connected to the first data bus 204 and the instruction data bus 208 and contains code and data which the RISC processor 1038 executes at start-up. This code and data consists of a plurality of algorithms usable by each of the downloaded execution modules, as discussed in more detail with FIG. 4.

In one embodiment of the invention, the RISC processor 1038 is a microprocessor which implements an enhanced MIPS-X instruction set. The MIPS-X instruction set is described in "MIPS-X INSTRUCTION SET and PROGRAMMER'S MANUAL," Technical Report No. 86-289, by Paul Chow, which is incorporated by reference herein in its entirety. In this embodiment, the RISC processor 1038 has 32-bit program instructions and 32-bit pipelined data. A memory interface 202 has an isolation circuit connected to the instruction data bus 208 and the first data bus 204. When the RISC processor 1038 executes an instruction that accesses data in the SRAM 222, the isolation circuit disconnects the SRAM 152 from the SCAN interface 202 so that the RISC processor 1038 fetches the next instruction from the SRAM 152 via the instruction data bus 208 simultaneously with the access to the SRAM 222. To improve the efficiency of 8-bit and 16-bit operations, MIPS-X instruction set is augmented to include the instructions disclosed in Appendix A. The RISC Processor 1038 is programmable using 'C' language compilers which are available for MIPS-X processors. In particular, the "VCP/RISCitt Developer's Toolkit" which is available from 8x8, Inc. of Santa Clara, Calif. provides a 'C' compiler which employs the augmented instructions set of Appendix A.

The SRAM interface 202 controls accesses to mapped I/O devised such as standard SRAM or non-volatile memory (ROM, EPROM, EEPROM, and flash). A data 32-bit data bus LD[31:0] and a 20-bit address bus LA[19:0] connects the SRAM interface 202 with the external SRAM 152, but the memory interface 202 also supports 16-bit and 8-bit devices. Signals on four byte enable lines, LWRLL, LWRLH, LWRHL, and LWRHH, determine which bytes in a 32-bit word are written to the external SRAM 152. The SRAM interface 202 supports four independent external address spaces for four banks of memory or mapped I/O devices. Four chip enable lines LCE[3:0] from the SRAM interface 202 select the address space being accessed. Each address space has programmable bus width and wait-states. The SRAM interface 202 and the RISC processor 1038 thus supports varied types of memories including SRAM, ROM, EPROM, EEPROM, and flash and memory mapped I/O devices.

In stand-alone applications, the RISC processor 1038 acts as the primary or only microcontroller and supervises the devices connected to the SRAM interface 202. In one application of the MEP 1024, the SRAM interface 202 connects to an SRAM, an EPROM, and an infrared sensor for a remote control device. The RISC processor 1038 executes software for coding of audio and video signals and software which polls registers in the infrared sensor to determine when to begin or stop encoding operations.

Figure 4:
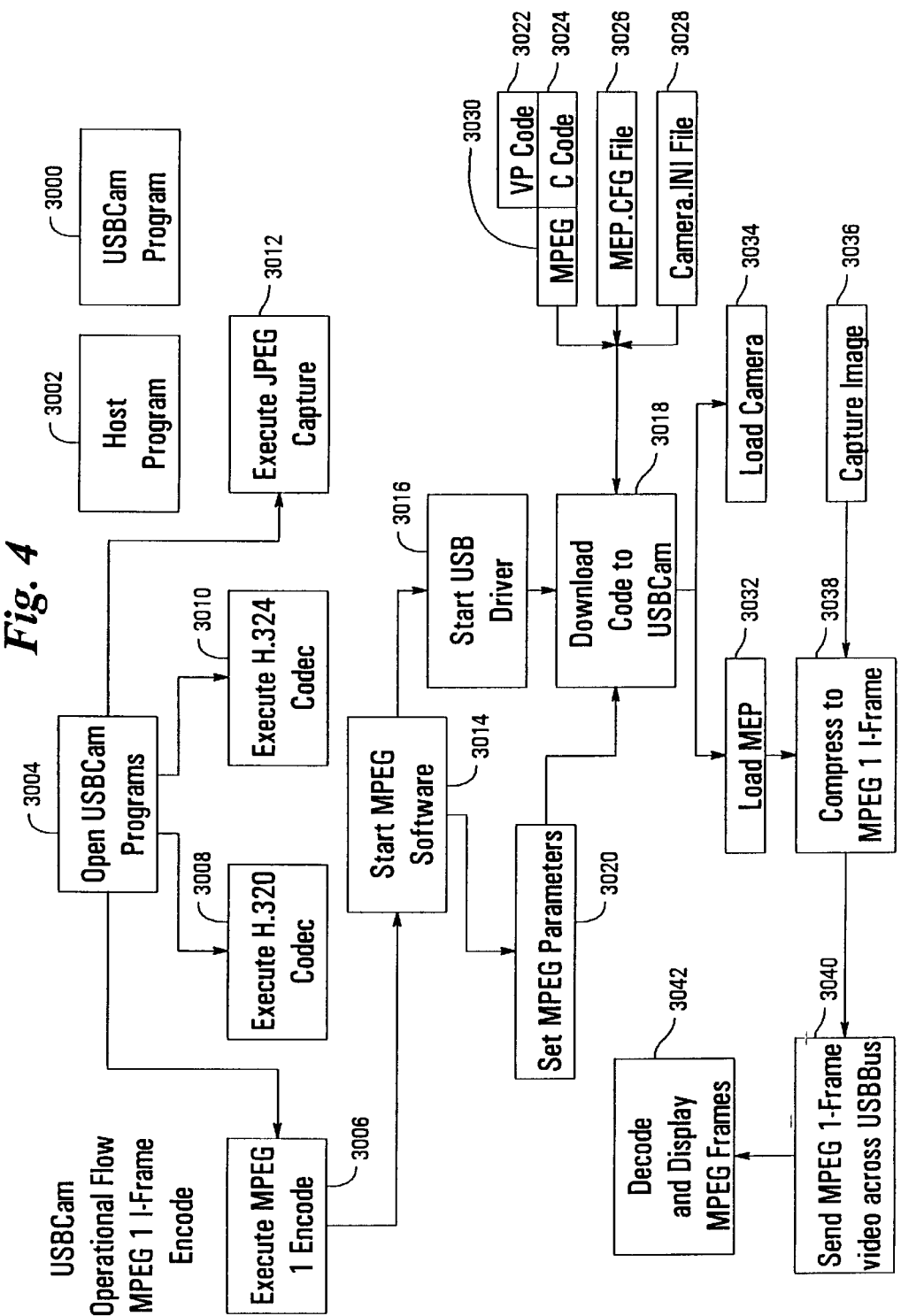
FIG. 4 is a flowchart of a method for compressing and decompressing video image data in the MPEG 1 I-Frame format using the system of the present invention.

Referring now to FIG. 4, there is shown one method according to the present invention, in flowchart form, for operating the video camera 1000 through the computer system 1002 to process an image in the MPEG 1 I-Frame format. MPEG is an acronym for "Motion Pictures Expert Group" and MPEG 1 is a standard algorithm defined for taking full-motion video primarily for broadcast or entertainment quality. In FIG. 4, shaded boxes indicate operations run on the video camera ("USBCam") 1000 and unshaded boxes indicate operations run on the host computer system 1002, as indicated by the legends at 3000 and 3002, respectively.

User Interface and Initialization: From the computer system 1002, e.g. an IBM-PC running Windows, the user opens 3004 a file which contains programs 3006, 3008, 3010, 3012 for the various compression modules. In this case, the options include MPEG1 3006, H.320 3008, H.324 3010 and JPEG 3012. In this example, MPEG1 3006 is chosen. First, the master program is initiated 3014 on the host computer 1002. Then the master program starts 3016 the communication interface module 1018 and instructs the computer 1002 to download 3018 code to the USBCam 1000 via the USBBus 1006. The first code to be transmitted 3020 are the impact parameters, which include all the parameters for different types of user preferences for the type of compression that the USBCam 1000 is to perform. These parameters could have been modified back in block 3014 or could be preset by the manufacturer or user. Also downloaded 3018 are the actual executables for the USBCam 1000, in this case MPEG 3030, MEP.CFG 3026 and Camera.INI 3028. The MPEG algorithm 3030 contains two executables which go 3032 directly to the MEP 1024. The MPEG algorithm 3030 contains 1) the VP code 3022, which is micro-code that runs on the video processor portion 1036 on the MEP 1024 and makes up the mathematical formulas or algorithms to do the compression, and 2) the C code 3024, the executable that runs on the RISC portion 1038 of the MEP 1024 and controls the MEP as a system. The MEP.CFG file 3026 is a configuration file which tells the MEP, among other things, at what bit rate to compress, how much compression and how much information to throw away, which colors to affect and any other parameters that the user may wish to set to customize the compression. The Camera.INI 3028 file is an initialization file which initializes 3034 the video source 1030 for different lighting and environmental set-ups such as focus, zoom, exposure, light balance, etc. All of the above parameters are specially tuned either on a case-by-case basis or product-by-product basis for the encode and for the actual imager that is being used. As mentioned previously, an alternative embodiment would download these MPEG, .INI and .CFG files not from the computer but from one of a plurality of cartridges inserted into the camera by the user according to which compression algorithm the user desires.

Image Capturing, Processing: Once initialization is complete, an image is captured 3036 by the video source 1030. This image is then sent to the MEP 1024 for compression 3038. Then the compressed image is sent 3040 through the interface link device 1022 back across the USBBus 1006 in the MPEG 1 I-Frame encoded format to the PC 1002. From here, the PC 1002 decodes 3042 and displays 3042 the MPEG frames for many uses including monitoring the quality of the frames or storing to hard disk. Alternatively, the PC 1002 leaves the data in compressed format for sending from memory or perhaps sending in real time across a communications interface such as the phone line 1008 to a viewer at a far away distance. A further alternative is to download the compression module from a cartridge as shown in FIG. 2a and described in this specification supra.

Figure 5:
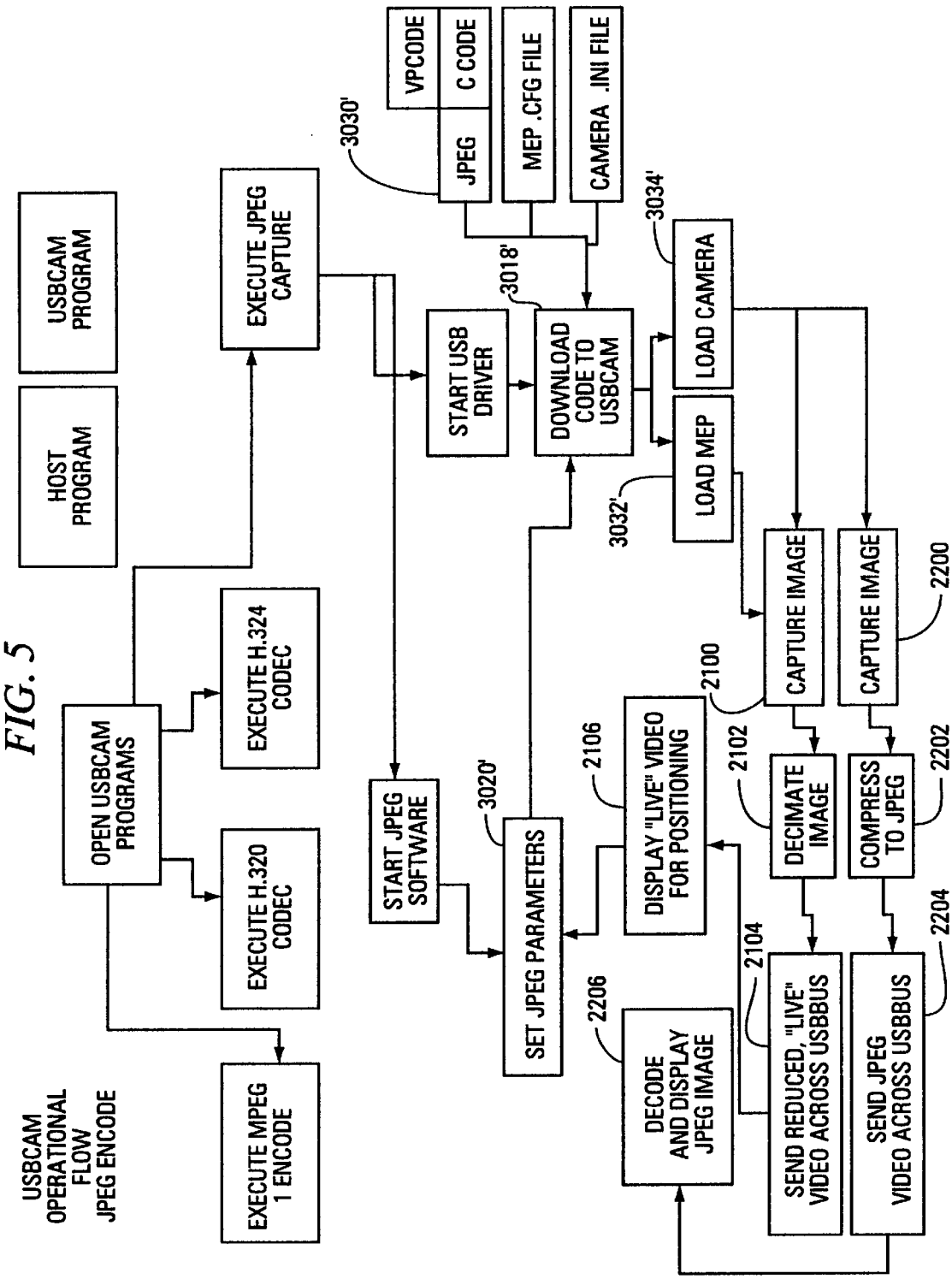
FIG. 5 is a flowchart of a method for compressing and decompressing video image data in the JPEG format using the system of the present invention.

Referring now to FIG. 5, there is shown a method according to the present invention, in flowchart form, for operating the video camera 1000 through the computer system 1002 to process an image in the JPEG format. JPEG, "Joint Photographic Experts Group," is a method for compressing a still image or one frame of video to take up a smaller space so it is either stored or transmitted more efficiently. It typically has a high color resolution and is used for snapshots.

This process begins in a similar fashion to that disclosed in FIG. 4. Again, as discussed herein under FIG. 4, it will be appreciated that maintaining a menu of algorithms in ROM within the camera 1000 itself, which are usable by all decompression modules, has numerous advantages. These advantages include the savings of ROM space on the video camera 1000, the savings of memory space 1014 on the computer 1002 and system response time due to the decreased amount of data that need be downloaded to the camera 1000 while the system downloads a compression module. One difference is that the MPEG algorithm 3030 is replaced with a JPEG algorithm 3030' for downloading 3018' to the USBCam 1000. After the MEP 1024 and video source 3018 are loaded 3032', 3034' with executables and algorithms, the process begins a first-pass image-capture 2100 which is decimated 2102. Decimation is affecting an image with a reduced size and/or a reduced color so that the image can be transmitted across the USBBus 1006 to the computer system 1002. The bandwidth of an image is reduced in one of two ways: reducing the number of frames per second or dropping the resolution of each frame. Typically a combination of the two is used. By decimating 2102 or doing only a small amount of compression, it is possible to send 2104 an image so that it is displayed 2106 without having any interruption in movement, allowing the user to refine 3020' the parameters of the JPEG compression. Therefore, the process from 2100 to 2106 and 3020' comprise a feedback loop for quick information to the user. When the user is satisfied with the parameters, the system takes the process from 2200 to 2206 to compress 2202 the image in a high-quality JPEG format, transmit 2204 via USBBus 2204 to the computer system 1002, and decode 2206 and display 2206 at the host computer system 1002. Alternatively, the computer system 1002 could leave the data in compressed format for sending from memory or perhaps sending in real time across a communications interface such as the phone line 1008 to a viewer at a far away distance.

Figure 6:
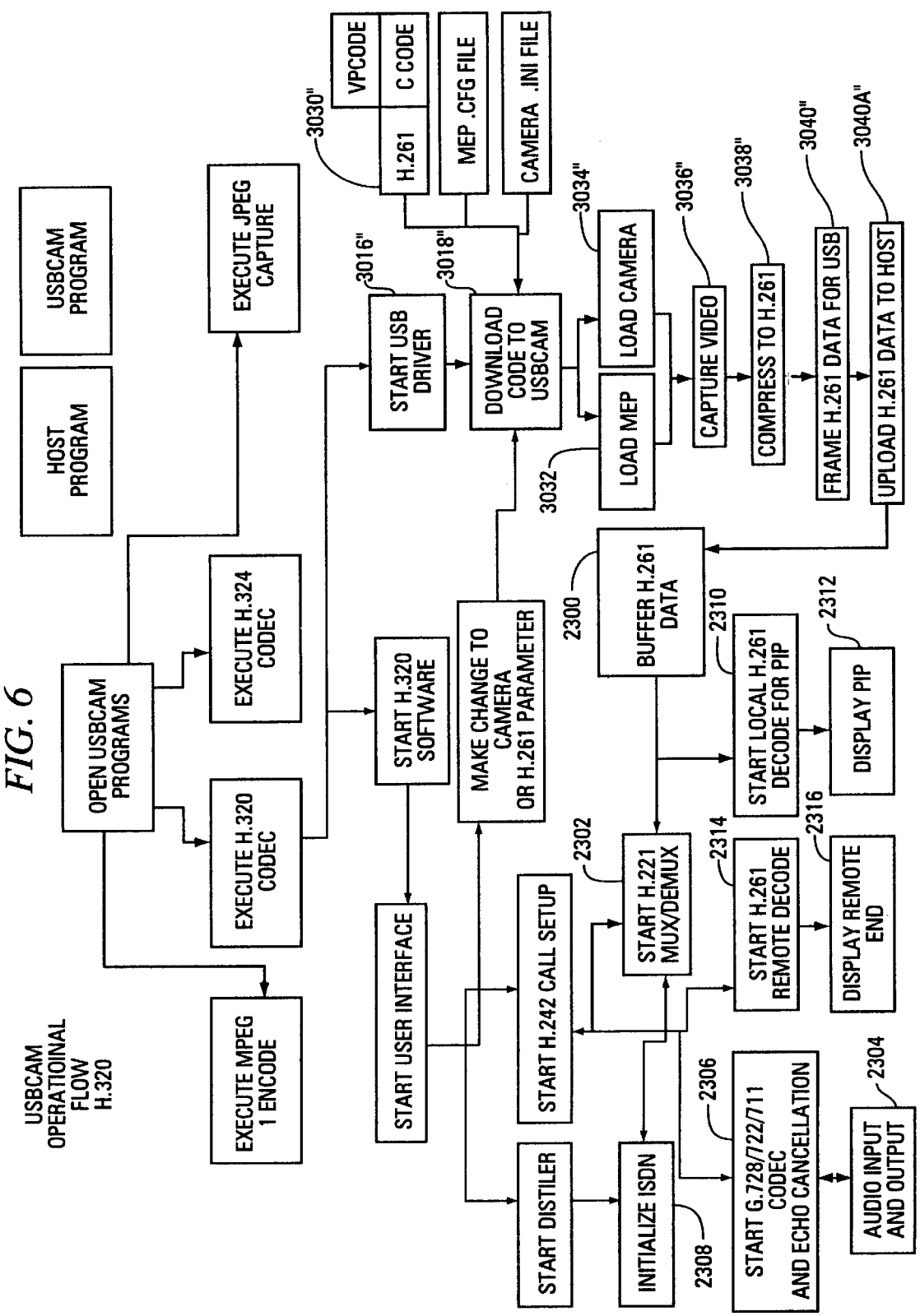
FIG. 6 is a flowchart of a method for compressing and decompressing video image data and audio data in the H.320 format using the system of the present invention.

Referring now to FIG. 6, there is shown a method according to the present invention, in flowchart form, for operating the video camera 1000 through the computer system 1002 to process an image in the H.320 format. H.320 is a standard promulgated by the International Telecommunications Union ("ITU"), a branch of the United Nations, for transmitting audio and video telecommunications across a broad band network, in this case ISDN.

This process begins in a similar fashion to that disclosed in FIG. 4. Again, as discussed herein under FIG. 4, it will be appreciated that maintaining a menu of algorithms in ROM within the camera 1000 itself, which are usable by all decompression modules, has numerous advantages. These advantages include the savings of ROM space on the video camera 1000, the savings of memory space 1014 on the computer 1002 and system response time due to the decreased amount of data that need be downloaded to the camera 1000 while the system downloads a compression module. One difference is that the MPEG algorithm 3030 is replaced with an H.261 algorithm 3030" for downloading 3018" to the USBCam 1000. H.261 is the video compression portion of the H.320 compression module. Similar to FIGS. 4 and 5, the MEP 1024 and video source 1030 are loaded 3032", 3034" with executables and algorithms, and then an image is captured 3036", compressed 3038", framed 3040" and uploaded 3040A" in H.261 format to the USBBus. One difference is that in steps 3040" and 3040A", the data is being transmitted 3040A" in real time, for example at 112 kilobits per second, across the USBBus 1006. Therefore, the data is buffered 2300 in the host computer's 1002 main memory 1014 to ensure a continuous flow of data to the ISDN port 2308. The buffered data is then multiplexed 2302 with the audio data. The audio data is shown coming in 2304 through the PC 1002 from a sound card or other computer-based microphone device. Alternatively, the audio data could be received by the video camera 1000 itself and compressed and multiplexed along a parallel path with the video data in 3036" through 3040A", for example by alternately compressing a video, then an audio packet. According to one embodiment, the audio is received 2304 and compressed 2306 in the H.221 format. The multiplexed audio/video compressed data is then transmitted out the ISDN port 2308.

Simultaneous with the audio/video multiplexing 2302, an additional process is running on the host PC at 2310. This process causes video feedback to be displayed to the user on a monitor by decompressing 2310 the video data and displaying 2312 the decompressed frames. A PIP is a "Picture in Picture" and gives the user a look at what is being transmitted over the ISDN line so that the user can make modifications in lighting, focus, etc. Also simultaneous with the other processes, audio and video data is coming in from the ISDN 2308, which is data from the remote end (other end) of the teleconference. This data is then demultiplexed 2302. The audio from the remote end is output 2304 to the user. The corresponding video is decoded 2314 and output 2316 to the user.

Figure 7:
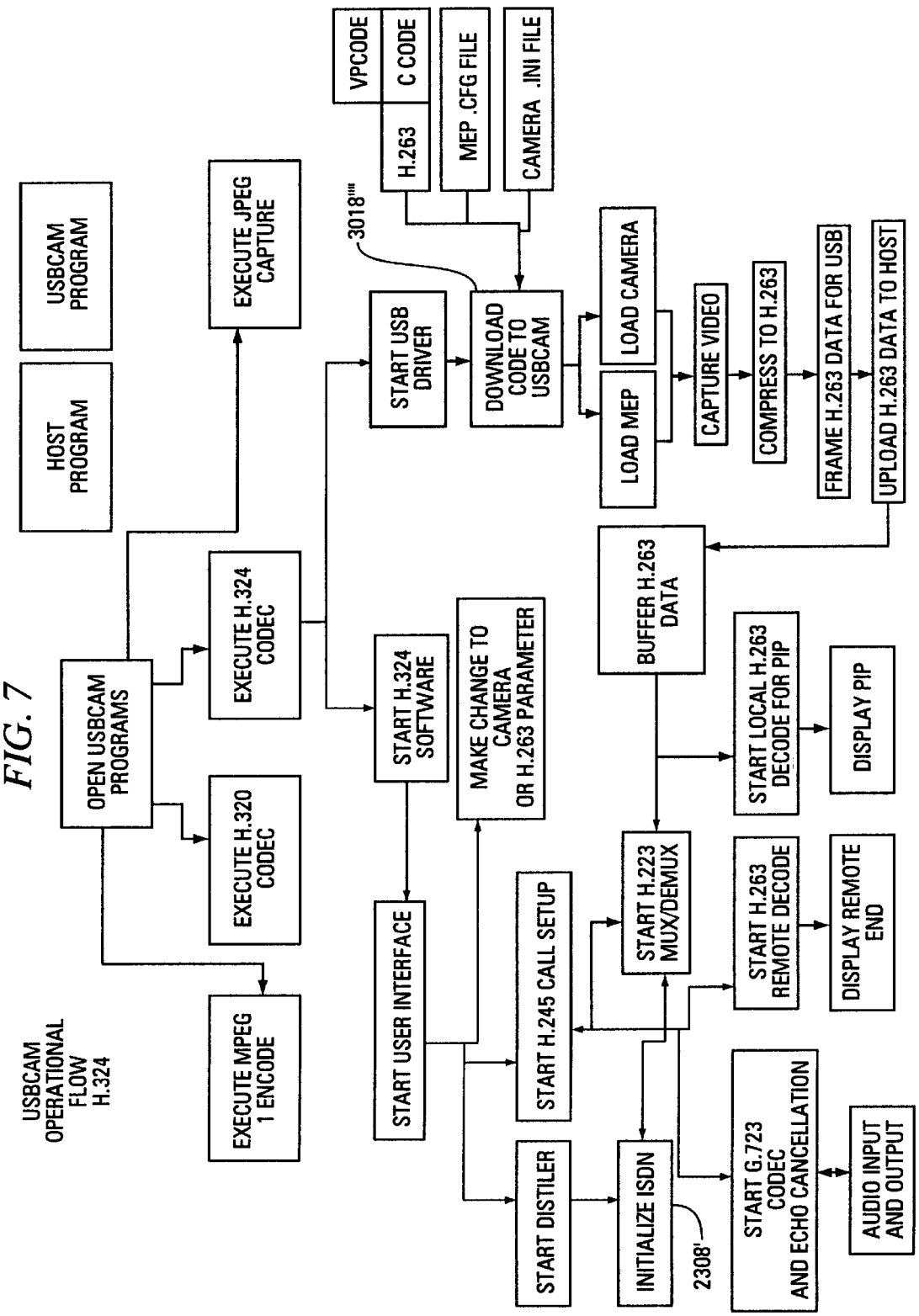
FIG. 7 is a flowchart of a method for compressing and decompressing video image data and audio data in the H.324 format using the system of the present invention.

Referring now to FIG. 7, there is shown a method according to the present invention, in flowchart form, for operating the video camera 1000 through the computer system 1002 to process an image in the H.324 format. H.324 is a set of recommendations related to H.320, also set by the ITU, with the same intent but in this case transmitting audio and video telecommunications across the PSTN network, i.e. normal telephone service. Again, as discussed herein under FIG. 4, it will be appreciated that maintaining a menu of algorithms in ROM within the camera 1000 itself, which are usable by all decompression modules, has numerous advantages. These advantages include the savings of ROM space on the video camera 1000, the savings of memory space 1014 on the computer 1002 and system response time due to the decreased amount of data that need be downloaded to the camera 1000 while the system downloads a compression module. There are two differences between the method disclosed in FIG. 6 for ISDN and that disclosed in FIG. 7 for PSTN. First, a different compression algorithm, PSTN, is downloaded 3018"". The PSTN algorithm is optimized for a lower bit rate than the H.261 algorithm. One advantage of this invention is that a user who has both an ISDN connection for the PC and a standard analog phone line can communicate with both types of users on the remote end. The other difference is that a modem is used 2308' instead of an ISDN connection 2308, said modem modulating and demodulating the analog line at a much lower bit rate, typically 28.8 kilobits.

Figure 8A:
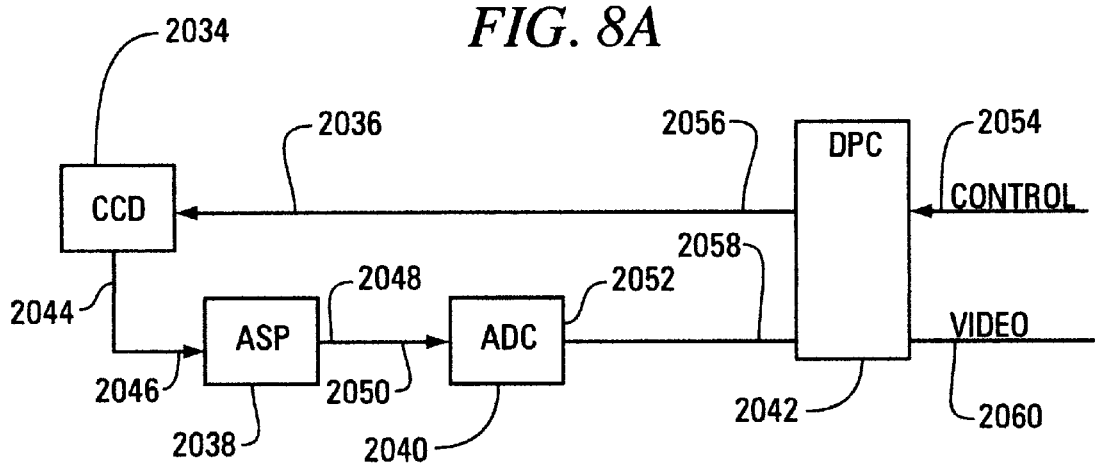
FIG. 8a is a block diagram of an embodiment of a video source of the compression camera of the present invention.

Referring now to FIG. 8a, there is shown an embodiment of the video source 1030. The video source 1030 comprises a charge-coupled device (CCD) 2034 for capturing images, an analog signal processor (ASP) 2038, an analog-to-digital converter (ADC) 2040, and a digital processing chip (DPC) 2042. The CCD 2034 has a plurality of control inputs 2036 coupled to a control output 2056 of the DPC 2042 for receiving camera configuration information from the MEP 1024. The CCD 2034 has a plurality of video outputs 2044 coupled to an input 2046 of the ASP 2038 to allow an analog image signal captured by the CCD 2034 to be formatted for subsequent conversion into digital form. The ASP 2038 has an output 2048 coupled to an input 2050 of ADC 2040 to allow the formatted analog signal to be converted to a digital signal before transmission to the MEP 1024 for compression. The ADC 2040 has an output 2052 coupled to a video input 2058 of the DPC 2042 to allow transmission of the digital signal to reach the MEP 1024. The DPC 2042 has a video output 2060 coupled to the MEP 1024 to send the digital video signal to the MEP 1024 to be compressed. In an embodiment of the present invention, video source 1030 is an Eyecam™ model digital camera manufactured by Silicon Vision of Fremont, Calif.

Figure 8B:
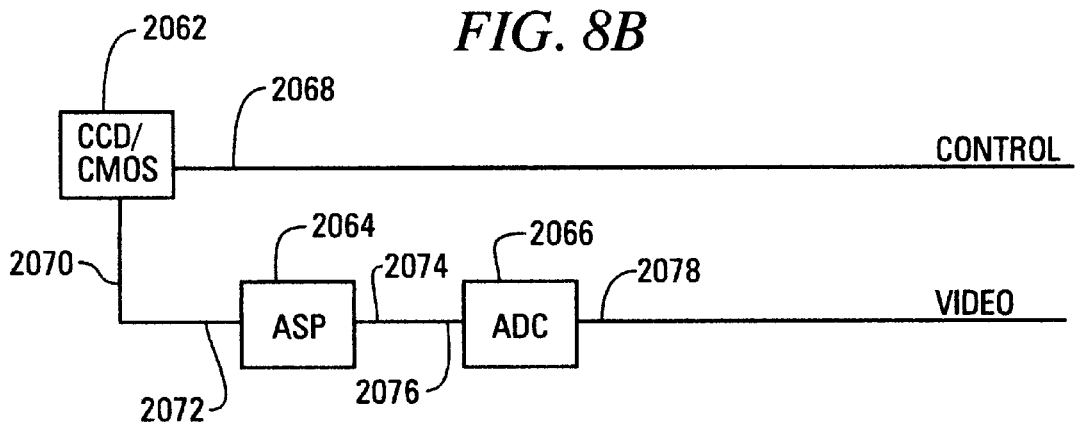
FIG. 8b is a block diagram of an alternative embodiment of a video source of the compression camera of the present invention.

Referring now to FIG. 8b, there is shown an alternative embodiment of the video source 1030. The alternative video source 1030 comprises a charge-coupled device with a complementary metal oxide semiconductor (CCD/CMOS) 2062 for capturing images, an analog signal processor (ASP) 2064, and an analog-to-digital converter (ADC) 2066. The CCD/CMOS 2062 has a plurality of control inputs 2068 coupled to the MEP 1024 for receiving camera configuration information. The CCD/CMOS 2062 has a plurality of video outputs 2070 coupled to an input 2072 of the ASP 2064 to allow an analog image signal captured by the CCD/CMOS 2062 to be formatted for subsequent conversion into digital form. The ASP 2064 also has an output 2074 coupled to an input 2076 of the ADC 2066 to allow the formatted analog image signal to be converted to a digital image signal before transmission to the MEP 1024 for compression. The ADC 2066 has an output 2078 coupled to the MEP 1024 to transmit the digital image signal to the MEP 1024.

Figure 8C:
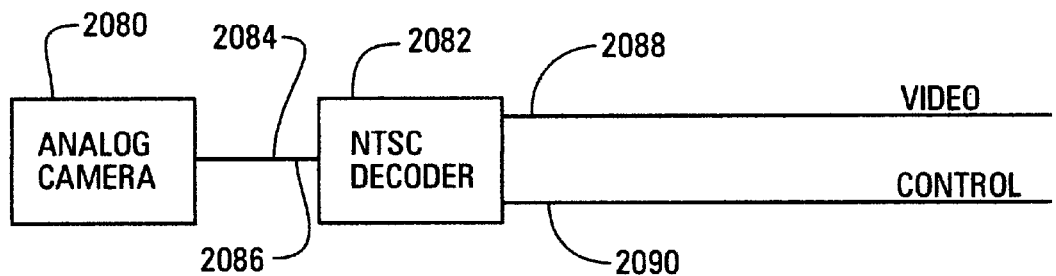
FIG. 8c is a block diagram of a second alternative embodiment of a video source of the compression camera of the present invention.

Referring now to FIG. 8c, there is shown a second alternative embodiment of the video source 1030. The second alternative video source comprises an analog camera 2080 having a video output 2084 coupled to a video input 2086 of a National Television Standards Committee (NTSC) decoder 2082. The NTSC decoder 2082 has a plurality of video outputs 2088 coupled to the MEP 1024 for sending image data to the MEP 1024 for compression. The NTSC decoder 2082 also has a plurality of control inputs 2090 coupled to the MEP 1024 for receiving configuration information.

Those skilled in the art will recognize that other types of video sources may be used in the compression camera 1000 of the system 2010 of the present invention. A range of different video sources is possible since an associated compression module for the appropriate compression standard is downloaded from the computer system 1002 to the MEP 1024, thus eliminating any video source dependency on a specific type of compression standard.

Figure 9:
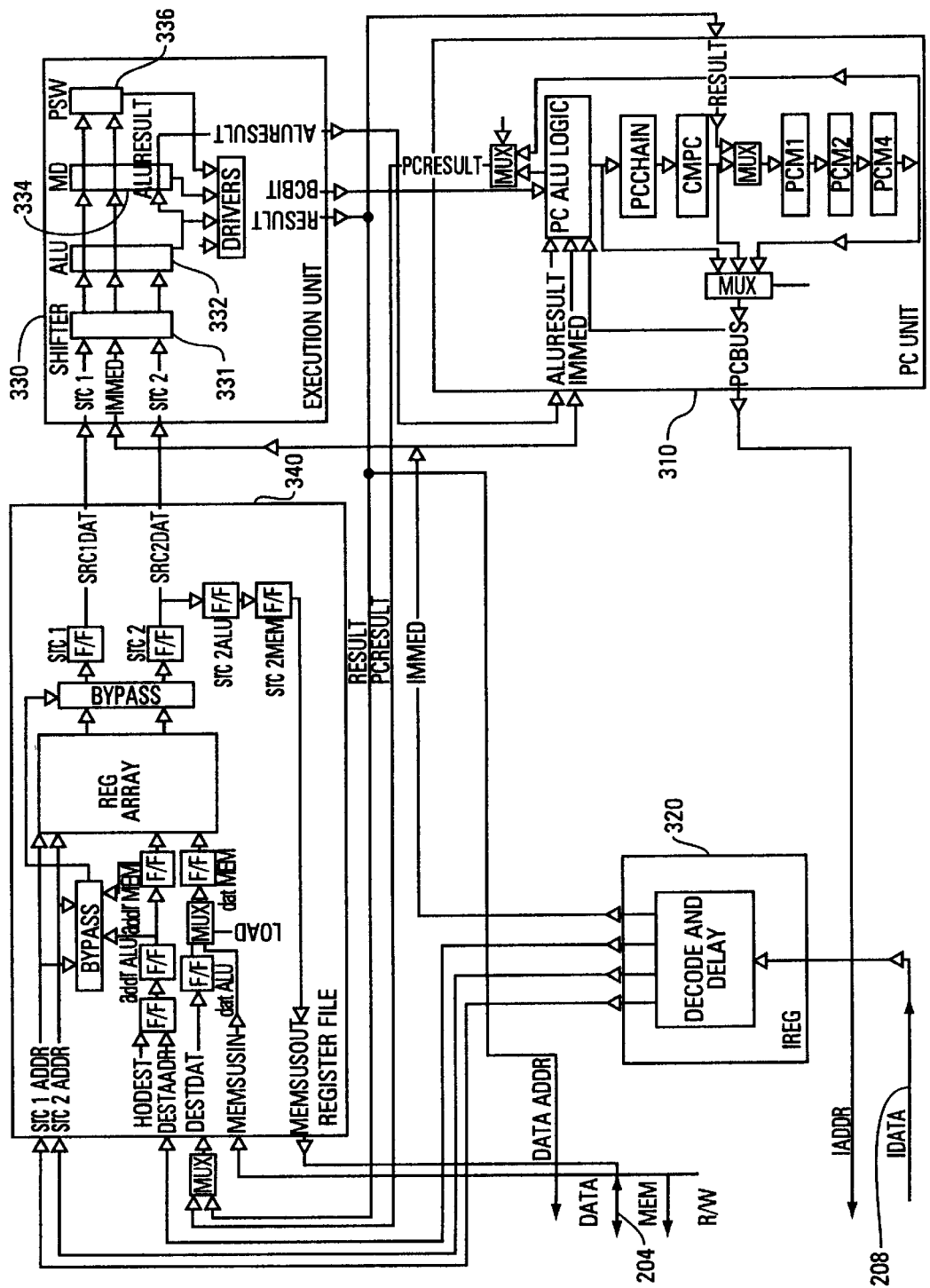
FIG. 9 is a block diagram of a RISC processor used in the video communications processor of FIG. 4.

FIG. 9 shows a block diagram of an embodiment of the RISC processor 1038 which implements the MIPS-X instruction set. "The MIPS-X Microprocessor," edited by Paul Chow, published (1989) by Kluwer Academic Publishers provides additional description of the architecture of such processors. The RISC processor 1038 contains a program count unit 310, an instruction decode unit 320, an execution unit 330, and a register file 340. The program count unit 310 generates a 30-bit instruction address signal IADDR identifying the location of a 32-bit program instruction which is loaded into an instruction register in the instruction decode unit 320. Instructions such as the load and store instructions have fields indicating source registers and destination registers in the register file 340. The instruction decode unit 320 generates 5-bit signals SCRC1ADDR, SCRC2ADDR, and DESTADDR which select registers in the register file 340. A signal IMMED indicates immediate data from the decoded instruction. The program count unit 310 increments signal IADDR to the next data instruction or, in the case of a branch instruction, changes signal IADDR according to a signal IMMED if a branch condition is met.

The execution unit 330 contains a shifter 331, an arithmetic logic unit 332, a multiplier/divider 334, and a processor status word 336. The execution unit 330 generates a signal RESULT from data signals SRC1DAT and SRC2DAT from the register file 340 and signal IMMED from the instruction decoder 320. Signal RESULT is stored in the register file 340 or asserted as an address signal DATA_ADDR for load and store instructions.

Figure 10:
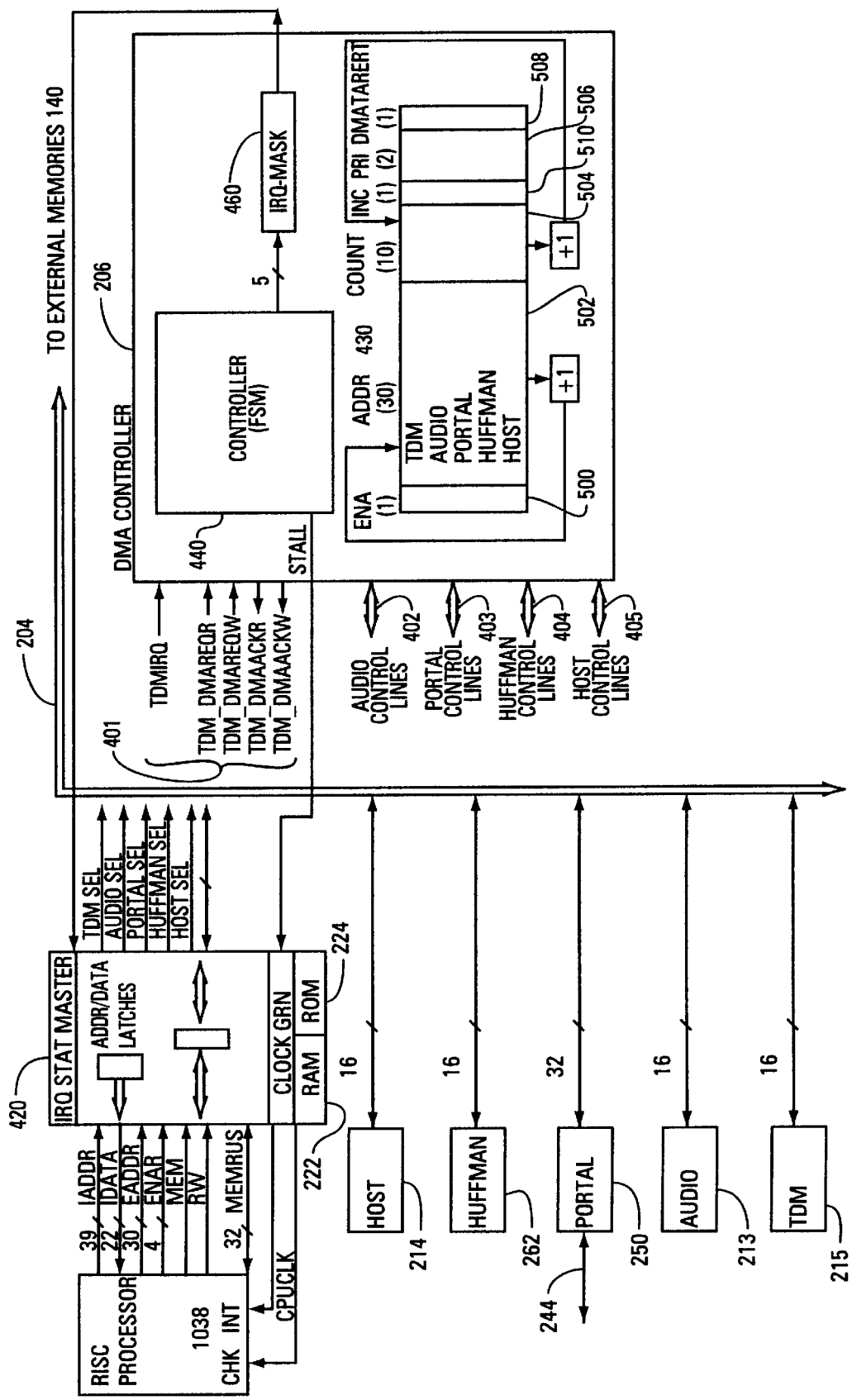
FIG. 10 is a block diagram of hardware coupled to a data bus used by a RISC processor in the video communications processor of FIG. 4.

FIG. 10 shows a block diagram of the DMA controller 206, the resources 213, 214, 215, 250, and 262, the RISC processor 1038, and a RISC interface circuit 420. The RISC interface circuit 420 includes the internal RAM 222 and the ROM 224, a clock generator 428, and an interrupt master. The clock generator 428 generates a clock signal for the RISC processor 1038 and for access to the external SRAM 152. The RISC interface 420 also generates a signal AUDIO_SEL, TDM_SEL, HOST_SEL, PORTAL_SEL, or HUFFMAN_SEL when the RISC processor 1038 asserts an address signal EADDR of a VCP register in the resource 213, 214, 215, 250, or 262.

The DMA controller 206 is a ten channel DMA controller which moves data via the SRAM interface 202, between the external SRAM 152 and the hardware resources including: the audio interface 213; the interface link port 214; the TDM interface 215; the portal circuit 250; and the Huffman encoder 262. Each resource 213, 214, 215, 250, and 262 has two channels, one for reading from and the other for writing to the SRAM 152. Five sets of control lines 401, 402, 403, 404, and 405 connect resources 215, 213, 250, 262, and 214, respectively, to the DMA controller 206. When one or more of the hardware resources 213, 214, 215, 250, or 262 requires access to the SRAM 152, the resources requiring access assert control signals on the control lines 401 to 405. For example, when the TDM interface 215 receives data from an external source such as a CD-ROM drive or an ISDN line, the TDM interface 215 asserts to the DMA controller 206 a signal TDM_DMAREQR to indicate that the TDM interface contains data to be read. The TDM interface 215 indicates availability for a write by asserting a signal TDM_DMAREQW. When a DMA channel is ready for the write or read, the DMA controller 206 asserts a signal TDM_DMACKW_ or TDM_DMAACKR. The TDM interface 215 asserts a signal TDMIRQ to request an interrupt of the RISC processor 1038 for direct communications between the TDM interface 215 and the RISC processor 1038. Similar control signals are used for communication with the resources 213, 214, 250, and 262.

Each DMA channel has an enable bit 500, a pointer field (a 30-bit address) 502, a count field 504, a priority field 506, a completed bit 508 and an "inc" field 510 in a register set 430 in the DMA controller 206. The RISC processor 1038 writes to the register set 430 to control the DMX channels. The RISC processor 1038 initiates a DMA transfer of data to a particular resource by: preparing a buffer in external SRAM 152, for example by writing data to the buffer if the data is to be transferred to the resource; writing the address of the buffer to the pointer field corresponding to the desired channel; writing a count indicating the size of the buffer, to the count field of the channel; and then setting the enable field of the channel.

Each channel has a priority. In one embodiment of the invention, the TDM interface 215 and the audio interface 213 have highest priorities because devices connected to these interfaces typically require specific timing for data transfers. The portal circuit 250 and the Huffman encoder 260 have intermediate priorities because data transfers between these resources are for internal operations which have flexible timing requirements. The interface link port 214 has lowest priority because typically host devices coupled to the interface link port 214 can be stalled if data is not ready when requested. The RISC processor 1038 changes the priority of each channel by setting an appropriate priority field in the registers 430.

A control unit 440 in the DMA controller 206 is a state machine which controls the ten channels. During a DMA transfer, the control unit 440 selects the enabled and ready channel which has the highest priority and asserts a signal STALL to prevent the RISC processor 1038 from using the first data bus 204 during the next clock cycle. The control unit 440 is limited to asserting signal STALL at most every other clock cycle so that the RISC processor 1038 operates at least at 50% of clock speed. While the RISC processor 1038 is stalled, one word of data is transferred on the first data bus 204 between a storage location in the SRAM 152, indicated by the pointer field for the channel, and the selected resource. The size of the word transferred depends on the selected channel. Channels for the resources 213, 214, 215, and 262 have 16-bit words. The portal circuit 250 has 32-bit words.

After a word is transferred, signal STALL is deasserted, and values in the pointer and count fields are incremented or decremented. When the count field reaches a cut-off value (for example if the count is decremented to zero), the control unit 440 asserts an interrupt signal to indicate that a DMA transfer requested by the RISC processor 1038 is complete. The RISC processor 1038 writes to a register 460 to mask interrupts.

The external SRAM 152 acts as FIFO storage for the numerous buffering operations and eliminates on-chip FIFOs. In some applications, external FIFO buffers between VCP and external devices are not needed because the RISC processor 1038 is programmed to create FIFO buffers in the SRAM 152. In many systems, the TDM interface 215 connects to an ISDN shipset and the audio port 213 connects to audio DACs or to a DSP for audio processing. Software executed by the RISC processor 1038 can reserve memory space in the SRAM 152 for data transfers to or from TDM and the audio interfaces 213 and 215 so that additional external buffers are not required.

Three input/output hardware resources coupled to the first data bus 204 include the audio interface 213, the interface link port 214, and the TDM interface 215. Circuits for implementing the input/output interfaces 213, 214, and 215 are known in the art. Accordingly, the description concentrates on the function of the interfaces 213, 214, and 215.

The TDM interface 215 implements a high-speed, bi-directional serial bus which is intended to transfer the encoded bit stream to a network interface. The TDM interface 215 implements a number of high-speed serial protocols including concentration highway interface (CHI), GCI, K2, SLD, MVIP and IMO2 formats. The TDM interface port 215 also acts as a general purpose 16 Mbit/sec serial link when not constrained by the TDM protocols.

The interface link port 214 provides a general purpose parallel interface to MEP 1024. The host device uses the interface link port 214 to control MEP 1024 and to transfer user, audio, and bit stream information. Signals HA[2:0] are asserted by the host device to select the three registers as source or destination of data signals HD[15:0]. The interface link port 214 uses lines HRDREQ# and WHRREQ# to indicate readiness to send and receive data. The MEP 1024 uses a line HIRQ to indicate that the host should read a register HOSTIRQSTAT containing interrupt information. Software executed by the RISC processor 1038 generates interrupts to the host for numerous desired reasons, but the host masks interrupts by writing to a register HOSTMASK in the interface link port 214.

The interface link port 214 contains three ports, a DMA port, a VCXI port, and Debug port. The DMA port typically transfers user data to be multiplexed with the audio and video data in an H.221 compliant encoded bit stream. This mechanism allows applications such as file transfer and shared screens during a video conference. In addition, DMA port carries the audio and multiplexed bit stream.

The VCXI port transfers commands and status information between MEP 1024 and the host device. In some systems, the MEP 1024 acts as the system controller and so there is no host device. In other systems, an external microprocessor, not the RISC processor 1038, is responsible for controlling the system. The external microprocessor controls the MEP 1024 through the VCXI port. One control technique is a "shared variable" mechanism which is implemented in software to give the host device read/write access to control variables in the program executed by the RISC processor 1038.

The debug port provides an additional path to the RISC processor 1038 for debugging purposes. This allows software debuggers access to the state of the MEP hardware and software without disturbing the VCXI or DMA ports.]

The audio interface connects directly to an audio ADC or DAC or codec, and software executed by the RISC processor 1038 is responsible for any audio compression.

Hardware processing resources attached to the first data bus 204 aid in the tasks performed by the RISC processor 1038. For example, compressed bit streams often include data structures that are not byte aligned. Conventional processors, such as the RISC processor 1038, load and store data aligned at byte boundaries and are less efficient at processing values which may straddle byte boundaries. The Huffman encoder 262 and X.261 compliant H.221/BCH bit stream parser/multiplexer 240 help the RISC processor 1038 process data structures which are not byte aligned.

Figure 11:
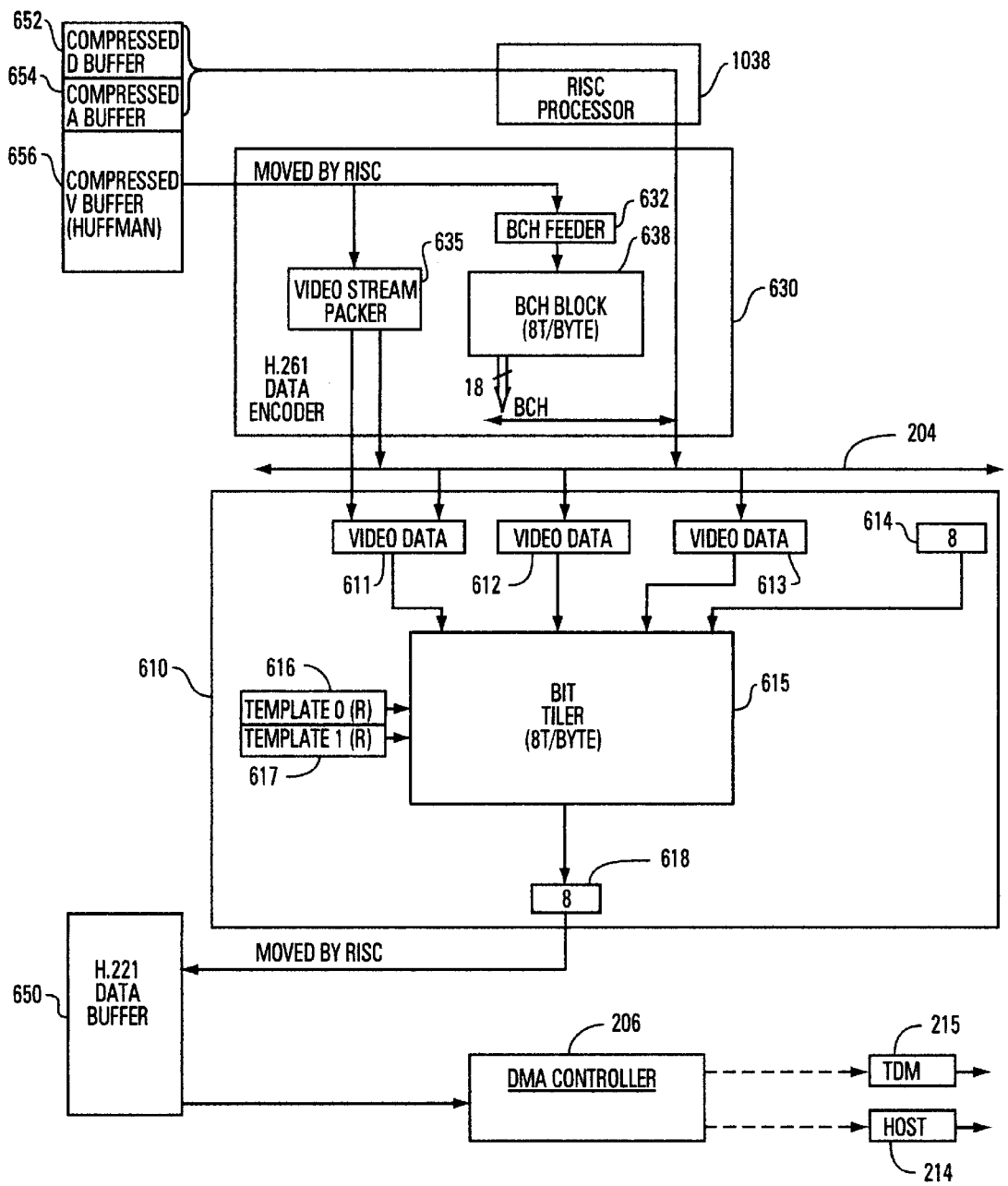
FIG. 11 is a data flow diagram indicating the operation of an ECC generator and a bit stream encoder.

FIG. 11 shows a data flow diagram of the resources 630 and 610 which assist RISC software in aligning, multiplexing and formatting audio, video, and user data for generation of a compressed bit stream. User data, compressed audio data, and compressed video data are stored in buffers 652, 654, and 656, respectively in the SRAM 152. The video processor 1036 compresses video data for the buffer 656. The RISC processor 1038 compresses audio for buffer 654, and the RISC processor 1038 creates the user data in the buffer 652.

Software controls data flow to the resources 610 and 630. The H.242, H.230 and H.243 specifications are also supported using RISC software. The resource 610 is a bit slice engine which combines data from registers 611, 612, and 613 into a register 618 in accordance with a template 616 or 617. The resource 630 is a BCH ECC generator which packs video data and generates an ECC which are compliant with H.261. The RISC processor 1038 feeds a type of compressed video data in to a set of eight registers 632 which have addresses indicating the number of bits in the byte which a BCH block 638 uses in calculating a BCH error correction code. A video packer 635 packs video data and error correction codes into a video stream.

The RISC processor 1038 moves video data from the packed video stream, audio data from the buffer 654, and user data from the buffer 652 into the registers 611, 612, and 613, loads templates into the registers 616 and 617, and then starts in the data multiplexer 610. A bit tiller 615 weaves bits from the registers 611, 612, and 613 according to a template in the register 616 or 617 to form, in the register 618, a byte of the output bit stream. The RISC processor 1038 periodically moves the byte from the register 618 to an output buffer 650 in the SRAM 152, and the DMA controller 206 moves the output bit stream through either interface link port 214 or TDM interface 215.

Figure 12:
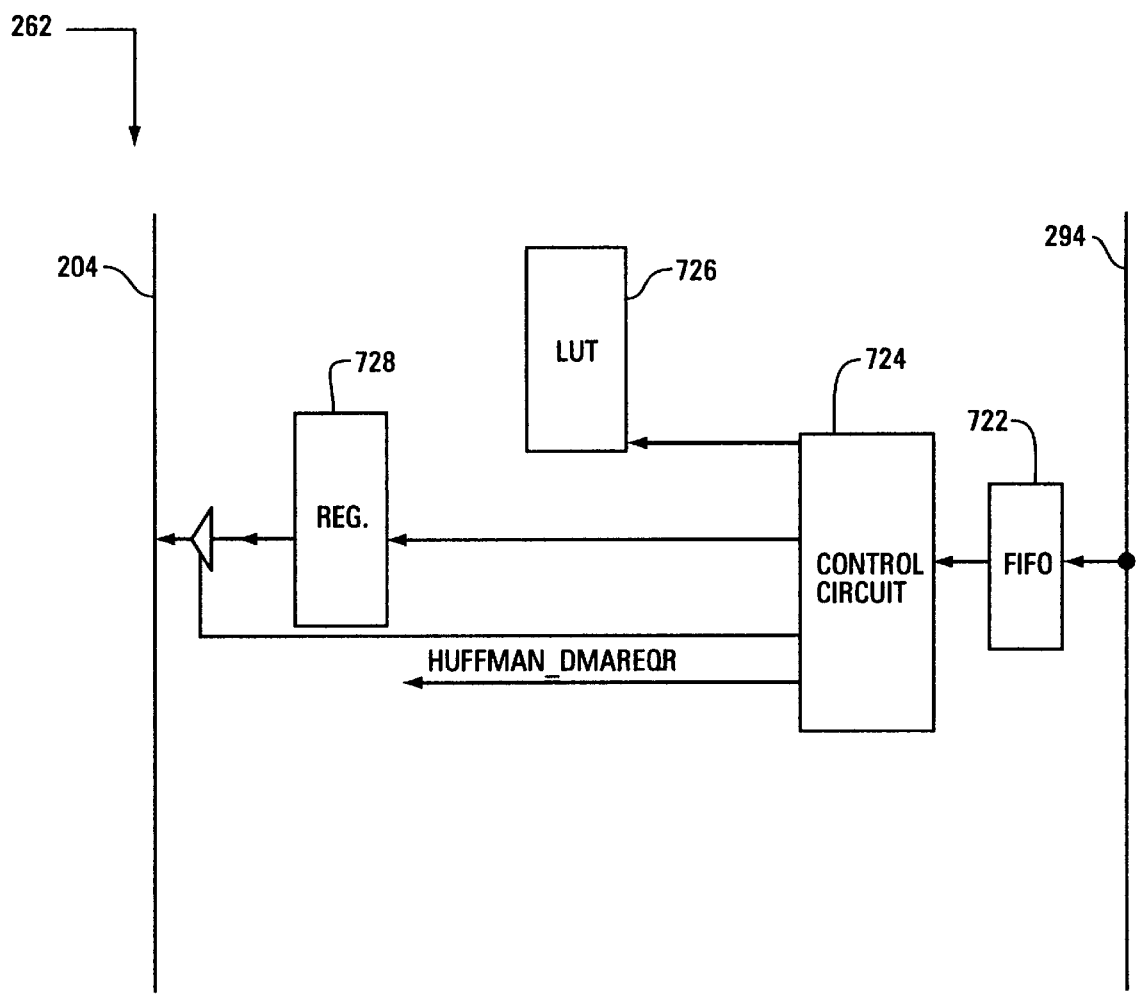
FIG. 12 is a block diagram of a Huffman encoder.

FIG. 12 shows an embodiment of the Huffman encoder 262. The Huffman encoder 262 is a high-speed engine which performs variable length encoding using Huffman tables that are stored in the Huffman encoder 262. It contains a look-up table 726, which is volatile memory which is easily changed and/or non-volatile memory for the look-up table defined by the MPEG, JPEG, and H.261 standards.

A FIFO buffer 722 in a Huffman encoding section receives values or RLA tokens from the second data bus 294. A control circuit 724 reads the variable length code from the look-up table 726 and packs the variable length code into a register 728. When the register 728 contains 16-bits of variable length codes, the control circuit 724 asserts a signal HUFFMAN_DMAREQR. The DMA controller 206 transfers the Huffman encoded data to a video buffer in the SRAM 152.

Resources in the MEP 1024 are organized so that most data transfers in MEP 1024 are between resources coupled to the same bus 204 or 294. The Huffman encoder 262 is coupled to both data buses 204 and 294 for transfers of Huffman coded data. Additionally, the portal circuit 250 provides a mechanism for transferring data between the buses 204 and 294. The portal circuit 250 forms a 32-bit bi-directional gateway between the first data bus 204 and the second data bus 294.

Figure 13:
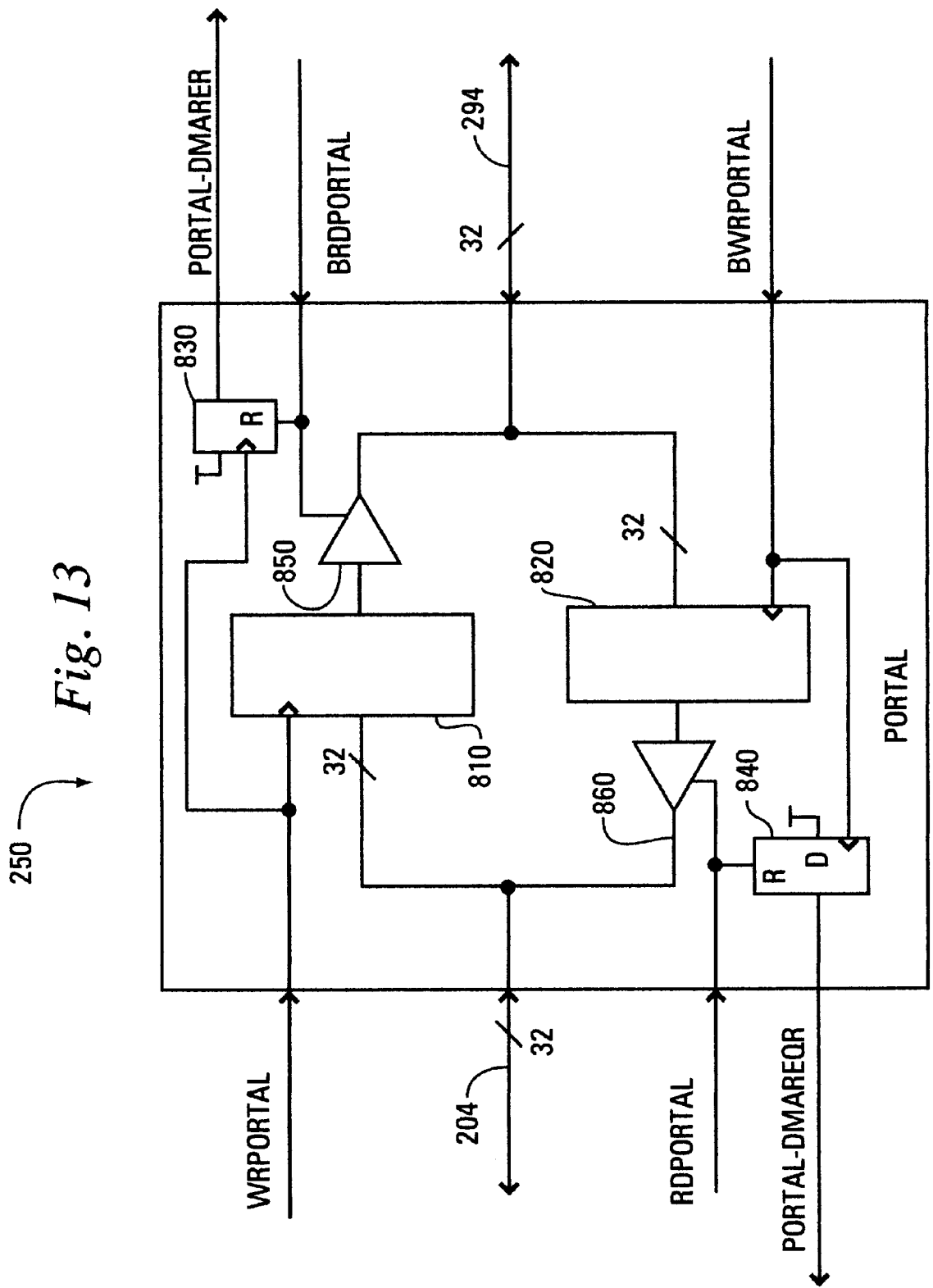
FIG. 13 is a schematic of a portal circuit for transferring data between data buses.

FIG. 13 shows a block diagram of the portal circuit 250 in accordance with an embodiment of the invention. The portal circuit 250 includes a pair of 32-bit registers 810 and 820. The register 810 has an input port coupled to the first data bus 204. When the DMA controller 206 asserts a signal PORTAL_DMAACKW or the RISC processor 1038 generates an address signal corresponding to the portal circuit 250, an address decode circuit (not shown) asserts a signal WRPORTAL, and the register 810 latches a value from the first data bus 204. Signal WRPORTAL triggers a flip-flop 830 which asserts a signal BPORTAL_DMAREQR to indicate that the portal circuit 250 contains data to be read. The data is read when the DMA controller 296 or the video processor 1036 cause an address decode circuit to assert a signal BRDPORTAL. Signal BRDPORTAL resets the flip-flop 830 and enables a tristate buffer 850 so that the register 810 drives the second data bus 294. Data transfers from the second data bus 294 to the first data bus 204 through the register 820, a flip-flop 840, and a tristate buffer 860.

Returning to FIG. 3, the DMA controller 296 has multiple channels which transfer 32-bit data via the DRAM interface 292 between the memory 140 and the video input interface 211, the Huffman encoder 262, the portal circuit 250, and the video processor 1036. Each of the video input interface 211, the video processor 1036, and the Huffman encoder 262 contain memory which allows the DMA controller 296 to transfer data in DRAM page mode.

In the exemplary embodiment, the DRAM interface 292 is a 32-bit wide interface that supports from 512 Kbytes to 8 Mbytes of external DRAM, implemented using x1, x4 or x16 chips and is configurable for addressing DRAM chips up to 16 Mbit in size operating at a variety of DRAM speed grades. The DMA controller 296 controls a DMA channel to DRAM refresh circuits in the DRAM interface 292 which reads sections of DRAM to refresh those sections.

Figure 14:
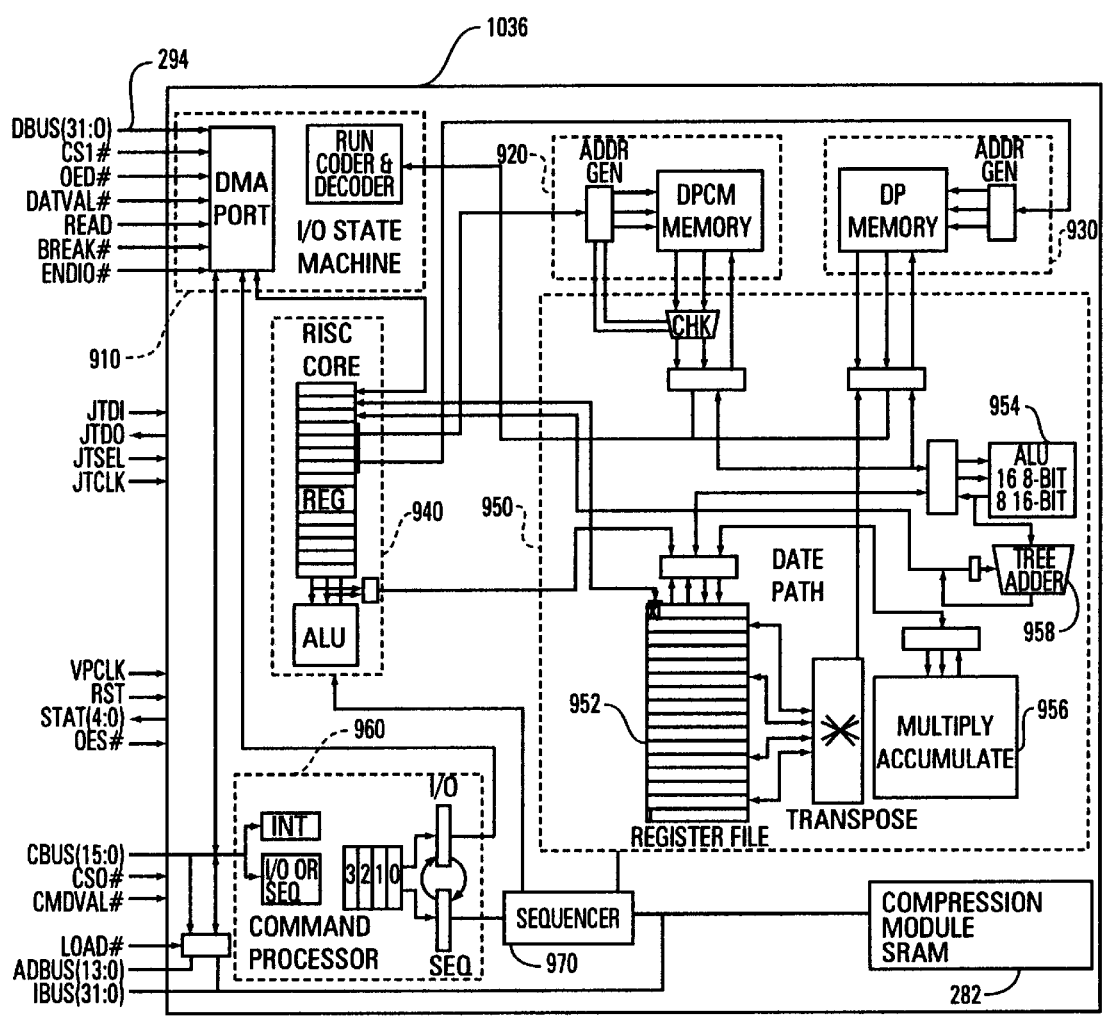
FIG. 14 is a block diagram of the video processor of FIG. 3.

FIG. 14 shows a block diagram of an embodiment of the video processor 1036. The video processor 1036 executes software which is stored in the compression module SRAM 282. The compression module SRAM 282 is a 2K×32 bit memory containing subroutines commonly executed on video processor 1036. The compression module SRAM 282 allows the RISC processor 1038 to download new subroutines for the video processor 1036. The RISC processor 1038 activates the video processor 1036 by writing to a command processor 960 which selects a subroutine from the compression module SRAM 282. The command processor 960 contains a queue for a sequence of subroutines to be executed by the video processor 1036. A RISC core 940 and a sequencer 970 decode microcode instructions from the selected subroutine and control a data path 970 which implements the microcode instructions. The RISC core 940 and the data path 950 run until the subroutine is complete, then a next subroutine is performed.

The data path 950 contains an arithmetic logic unit 954, a tree adder, multiple multiply-accumulators 956, and a register file 952 which is divided into four banks of 64 16-bit registers. For some instructions, the data path 950 processes all data in a bank of registers in the register file 952. This facilitates video processing which commonly performs repetitive operations on blocks of data. An I/O state machine 910 controls input and output of data on data bus 294. Each memory read operation moves eight bytes (two 32-bit words) into the video processor 1036 and can occur simultaneously with computations by the RISC core 940 and the data path 950. The memories 920 and 930 provide storage for data before being moved into the data path 950.

U.S. patent application Ser. No. 07/838,380, entitled "Programmable Architecture and Methods for Motion Estimation," by Jan Fandrianto et al.; and U.S. Pat. No. 5,379,351, entitled "Video Compression/Decompression Processing and Processors," issued Jan. 3, 1995, describe architectures for embodiments of video processor 1036. Both U.S. patent application Ser. No. 07/838,380 and U.S. Pat. No. 5,379,351 are incorporated by reference herein in their entirety.

The video input interface 211 contains processing resources which filter and scale incoming data. Parallel operation of the video processor 1036 and the video input interface 211 increases processing power and speed.

The video input interface 211 captures video frames which the DMA controller 296 stores in the memory 140. The video input interface 211 also provides hardware pre-processing functions usable in conjunction with software running on the video processor 1036. The video input interface 211 receives asynchronous digitized data from an outside video source such as a camera and a video ADC. Video data is input in CCIR 601 YUV pixel format, or a seven-tap programmable filter in video input interface horizontally scales data to this resolution. In the embodiment described below, the input video data is assumed to comply with the CCIR 4:2:2 data format for Y:U:V data, but other formats for video data could be employed.

The video input interface 211 processes lumina (or Y) data in parallel with chroma components U and V.

Figure 15A:
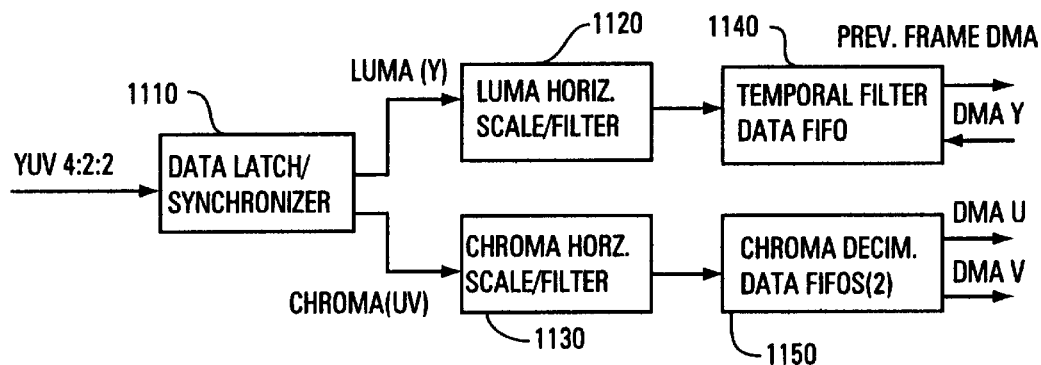
FIGS. 15a, 15b, 15c and 15d are block diagrams of pre-processing resources in a video input interface.

FIG. 15a illustrates the data flow through video input interface 211. Video input interface 211 contains an input data latch 1110, horizontal scaling filters 1120 and 1130 for lumina and chroma data, a temporal filter for lumina data, and two chroma decimators 1140, 1150. Input latch 1110 latches incoming data according to an external pixel clock signal PCLK2XCAM and synchronizes the data for processing according to an internal clock signal TCLK. The frequency of pixel clock signal PCLK2XCAM is less than one half the frequency of clock signal TCLK and if a 7-tap horizontal scaling filter is being used, is less than one quarter the frequency of signal TCLK. Signal TCLK is typically twice the frequency of signal CPUCLK. Synchronized data is transmitted to scaling filters 1120 and 1130.

Figure 15B:
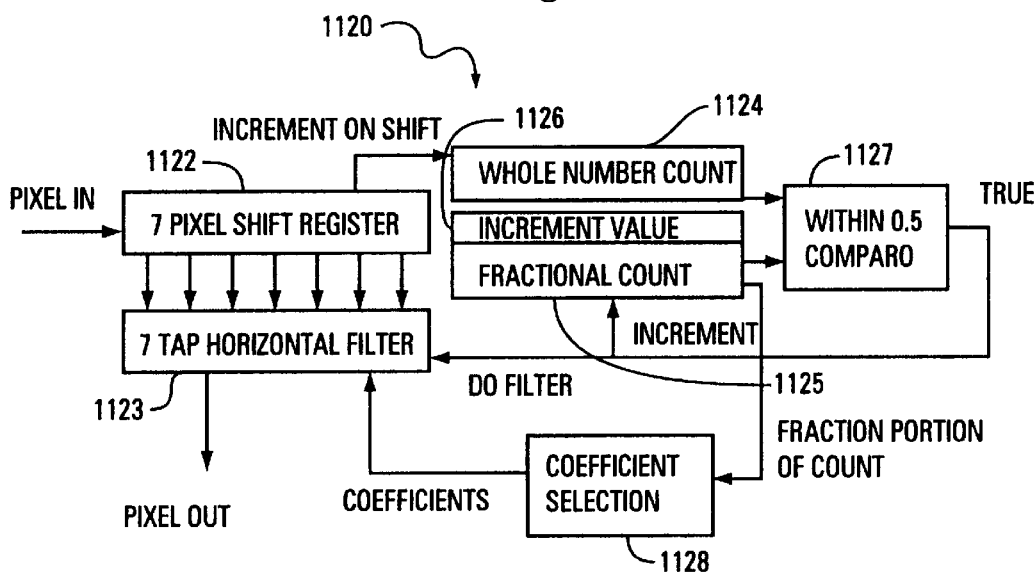

FIG. 15b shows a block diagram of a horizontal scaling filter 1120 which filters lumina data. The filter 1120 scales the input video data down horizontally by any factor, for example, the 640 pixels of 12.3 MHz sampled NTSC can be scaled to the 176 pixels of QCIF. The filter 1120 contains a shift register 1122 with the capacity to contain lumina values for seven pixels. The seven lumina values are the inputs of a 7-tap digital filter circuit 1123 which has programmable coefficients provided by a coefficient selection register 1128. To use the filter 1120, the RISC processor 1038 initializes counters 1124 and 1125, writes an increment value for the counter 1125 to an increment register 1126, and writes sets of filter coefficients to coefficient selection registers 1128. The counter 1124 contains a whole number count indicating a number of pixels input into the filter 1120, and the counter 1125 contains a count having a whole number part and a fractional part. In the exemplary embodiment, the register 1126 is a 16-bit register, and the value in the register 1126 has a 4-bit whole part and a 12-bit fractional part which together indicate the ratio of the number of pixels in a line of a frame input to the filter 1120 to the number of pixels in a line of a frame output from the filter 1130. The counter 1125 periodically increments by the increment value in the register 1126.

Typically, the video input interface 211 receives more pixel values than are intended to be captured, and the shift register 1122 is initially filled with lumina values before processing of captured values begins. Alternatively, the shift register 1122 is initially filled copies of the first captured pixel value. Captured values indicating lumina of pixels are input into the shift register 1122, and the counter 1124 increments by one for each pixel value. A comparator 1127 compares the whole number count in the counter 1124 to the count in the register 1125. If the counts in the counters 1124 and 1125 are more than 0.5, a new pixel value is loaded into the shift register 1122, and the counter 1124 again increments by one. Pixels are loaded into the shift register 1122 and the counter 1124 increments until the counts in the counters 1124 and 1125 are less than 0.5 apart. The counters 1124 and 1125 are typically initialized to zero, but the counter 1124 can be initialized to 3 less than counter 1125 so that the shift register 1122 contains some data before the counts in the counters 1125 and 1124 are less than 0.5 apart.

When the counts in the counters 1124 and 1125 are less than 0.5 apart, the filter circuit 1123 generates an output pixel value from the seven pixel values in the shift register 1122. Coefficients for the filter circuit 1123 are selected according to the fractional part of the count in the counter 1125. For example, in the exemplary embodiment, if the fractional part is in the interval (0, 0.1) or (0.9, 1.0), (0.1, 0.3), (0.3, 0.5), (0.5, 0.7), or (0.7, 0.9), then the first, second, third, fourth, or fifth, respectively, set of coefficients in registers 1128 are selected. The output pixel value PO is $$PO=[A*P1+B*P2+C*P3+D*P4+E*P5+F*P6+G*P7]/N$$

where P1 to P7 are the pixel values in the shift register 1122, A, B, C, D, E, F, and G are the selected set of filter coefficients; and N is a normalization factor which depends on the filter coefficients.

When an output pixel value is generated, the counter 1125 increments by the amount of the increment value in the register 1126. If the increment value is less than 1.0, output data has more pixel per line than does the input data, and another comparison 1127 is performed before another pixel value is loaded into the shift register 1122. If the counts in the counters 1124 and 1125 are still less than 0.5 apart, another set of filter coefficients is selected, and the filter circuit 1123 generates another output pixel value. Otherwise, a new pixel value is loaded into the shift register 1122, and the oldest pixel value is shifted out.

Limiting the increment value to greater than one limits the number of filter operations to fewer than one per input pixel, and provides predictable timing. In the exemplary embodiment of the filter 1120, contains two multipliers which operate in parallel. Accordingly, a seven tap filter requires four clock cycles to perform the multiplicatons for one filter operation. Additional and then a division (or logical shift right) are pipelined with the multiplications. In order to avoid an input data overflow when one filter operation is performed per input pixel, clock signal TCLK for the multipliers is at least four times faster than pixel clock signal PCLK2XCAM. The filter 1120 is operable in a three tap mode that calculates an output pixel value $$PO=[A*P1+B*P2+C*P3]/N$$

in two clock cycles or signal TCLK and permits signal PCLK2XCAM which are up to one half the speed of signal TCLK.

Horizontal scaling filters 1130 for chroma data are similar in construction. However, since the transmission rate for U or V values is half the transmission rate of Y values in the 4:2:2 protocol, a single filter circuit 1123 processes both U and V data. Accordingly, scaling filter 1130 contains two shift registers, one for U data and one for V data, but is otherwise substantially the same as the scaling filter 1120.

Figure 15C:
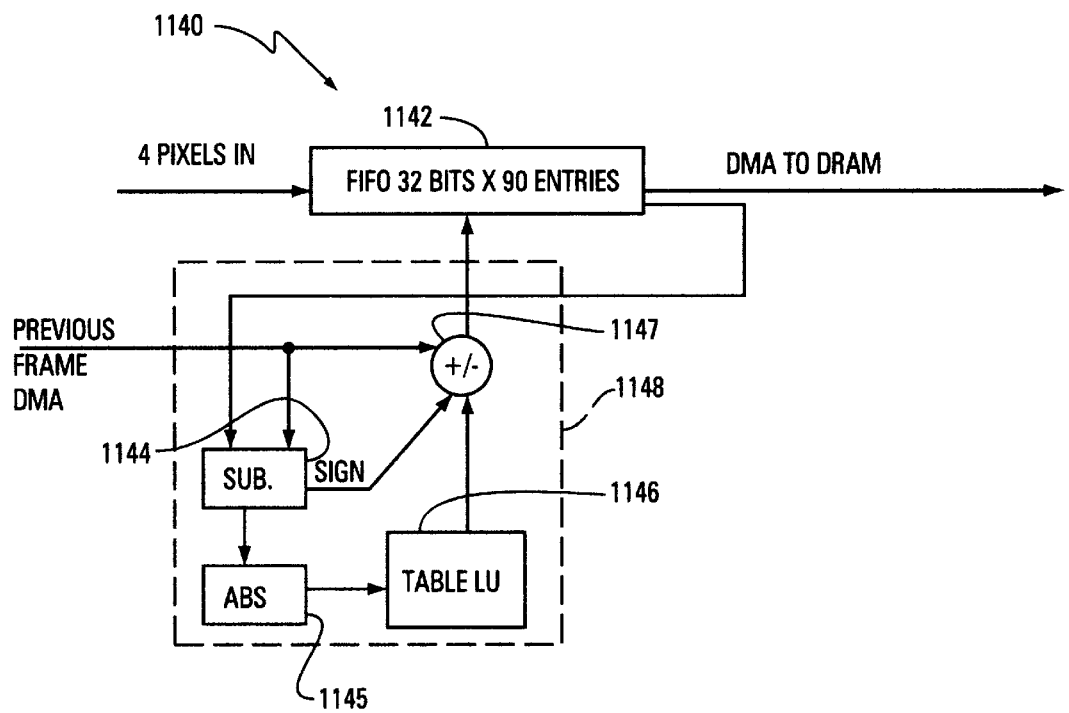

After data is scaled horizontally, lumina data is assessed to a temporal filter 1140, and chroma data is assessed to chroma decimators 1150. FIG. 15c shows a block diagram of an embodiment of the temporal filter 1140. Four 8-bit pixel values from the scaling filter 1120 provide a single 32-bit word which is stored in a FIFO buffer 1142. In one embodiment, the FIFO buffer 1142 contains 90 entries. The DMA controller 296 moves 32-bit words from the FIFO buffer 1142 to a buffer in the memory 140 for subsequent processing by the video processor 1036. If the RISC processor 1038 enables temporal filtering, a temporal filter circuit 1148 filters pixel values before the pixel values are moved from the FIFO buffer 1142. The filter operation performed on a lumina pixel value Pin to generate a pixel value Pout is $$Pout=A*Pin+(1-A)*Pin^{-1}=Pin+B*(Pin^{-1}-Pin)$$

where: A is a fraction; B is equal to 1−A; and $Pin^{-1}$ is a pixel value from the preceding frame, at the same position as pixel value Pin. The DMA controller 296 has a DMA channel for retrieving pixel value $Pin^{-1}$ from the memory 140.

In the exemplary embodiment, the temporal filter circuit 1148 adds value B* ($Pin^{-1}$−Pin) to value Pin in FIFO buffer 1142. A subcontractor 1144 determines a difference ($Pin^{-1}$−Pin), and a circuit block 1145 determines an address to a look-up table 1146 from the absolute value of the difference. The look-up table 1146, which is stored in a RAM inside the filter circuit 1146, provides a value B* ($Pin^{-1}$−Pin) which the adder/subtractor 1147 adds or subtracts from value Pin. The temporal filter circuit 1148 is sufficiently fast to filter one pixel value per cycle of signal TCLK.

Figure 15D:
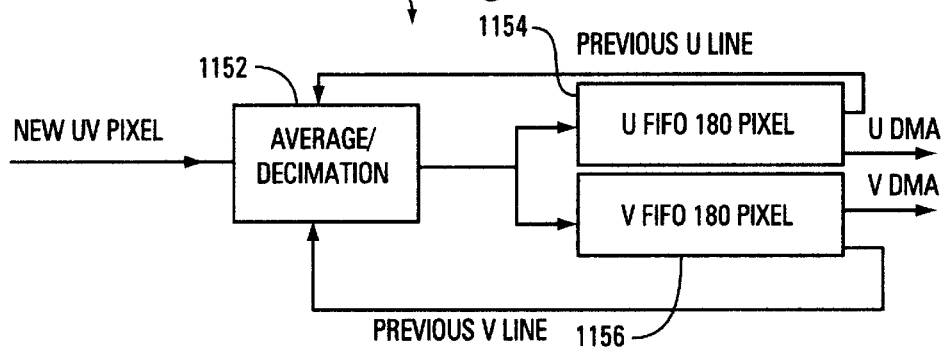

The chroma decimator 1150, when enabled, converts a YUV video signal in the 4:2:2 format to a YUV signal in the 4:2:0 format which is the format used by MPEG, H.261 and most video compression processes. The 4:2:2 format contains a U pixel value and a V pixel value for every two Y pixel values. In the 4:2:0 format, U and V value in two adjacent lines are averaged to cut the number of U and V values in half. FIG. 15d shows a block diagram of an embodiment of the UV chroma decimator 1150. The chroma decimator 105 contains a FIFO buffer 1154 for U pixel data and a FIFO buffer 1156 for V pixel data. Each FIFO buffer 1154 and 1155 has sufficient capacity for a full line of chroma data. Initially, a full line of pixel values feed unchanged from the horizontal filter 1130,/through an average/decimation circuit/; 1152 to fill the FIFO buffers 1154 and 1156. When a next line of U and V data beings feeding into the average/decimation circuit 1152, the circuit 1152 determines the average of a new U or V value and a corresponding U or V value from the previous line stored in the FIFO buffer 1154 or 1156. The resulting average is stored into the FIFO buffer 1154 or 1156. When the last pixel value in a line of a frame is averaged, the DMA controller 296 controls two DMA channels which transfer data from the FIFO buffers 1154 and 1156 to U and V buffers in the memory 140. While data is being DMA transferred out of the buffers 1154 and 1156, the next line of U and V data is feeding unchanged into the FIFO buffers 1154 and 1156. Decimation proceeds in this fashion transferring average U and V data every other line of a frame.

The video processor 1036 uses software controlled compression technique to compress the Y, U and V input pixel data which was transferred from the video input interface 211 to respective data buffers in memory 140.

Figure 16:
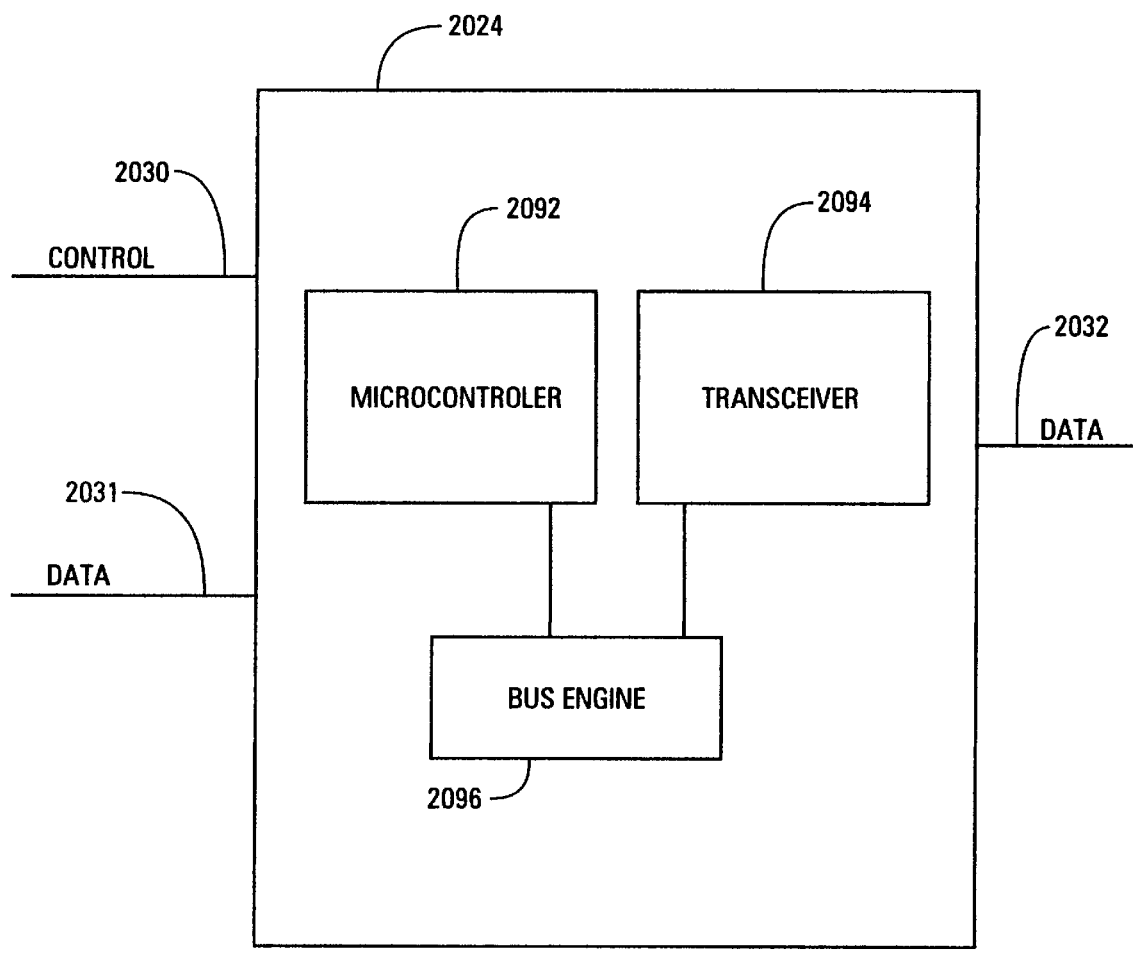
FIG. 16 is a block diagram of an interface link device for use with the compression camera, in accordance with the principles of the present invention.

Referring now to FIG. 16 there is shown a block diagram of the interface link device 2024 of the present invention. The interface link device 2024 comprises a microcontroller 2092, a transceiver 2094, and a bus engine 2096. The microcontroller 2092 controls operation of the interface link device 2024. The bus engine 2096 formats data to be sent across the interface link 1006. This data can be parallel or serial, synchronous or asynchronous, streaming or packetized depending on the protocol used for the interface link 1006. The transceiver 2094 takes the formatted data and passes it along to the interface link 1006. The link 1006 is conventional and may be implemented using, for example, the Universal Serial Bus (USB).

Many different formats of compressed data, such as MPEG, MPEG1, MPEG2, JPEG, H.263, H.261, and Fractal, may be transmitted across the USB to the computer system 1002. Alternatively, the interface link 1006 may be a parallel interface bus, a P1394 interface cable, or a wireless infrared connection. One skilled in the art will recognize that other types of interface links may be used. The interface bandwidth need only exceed the compression module bandwidth requirements. Since the bandwidth of the audio and video data is being reduced before transmission across the interface link, low cost and commonly available interfaces may be used.

Figure 17:
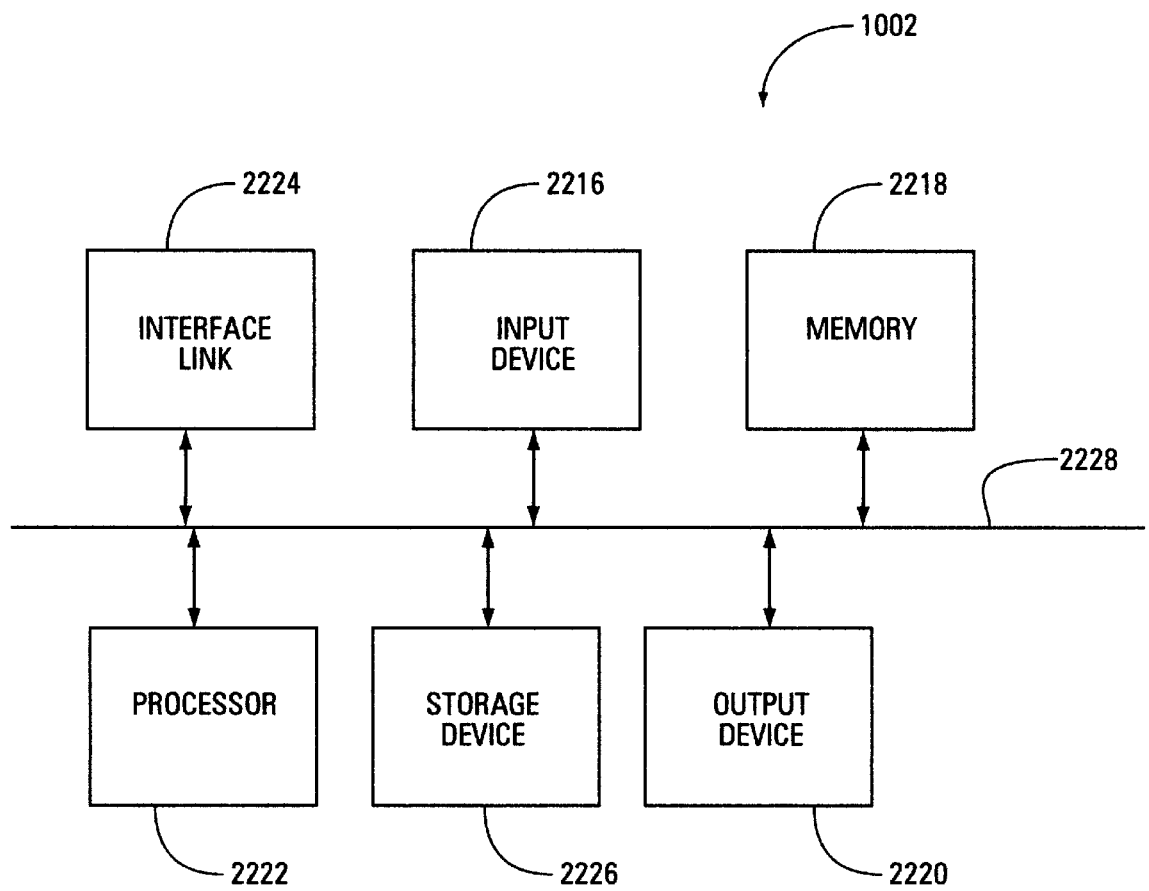
FIG. 17 is a block diagram of a computer-based implementation of the present invention.

Referring now to FIG. 17, there is shown a block diagram of a computer system 1002 of the video compression and decompression system 2010 of the present invention. The computer system 1002 has an input device 2216, a memory 2218, an output device 2220, a central processing unit (CPU) 2222, and a storage device 2226, each coupled to a computer bus 2228. During operation, the decompression module 1020, the user interface module 1016, and the communication interface module 1018 are transferred from the storage device 2226 to the memory 2218 for access by the CPU 2222. In one embodiment 2222, the CPU is a Pentium Processor manufactured by Intel of Santa Clara, Calif.

The input device 2216 is a user-actuated control device such as a keyboard or a mouse and is coupled to the computer system 1002 to generate signals indicating to the CPU 2222 which choice of video application the user prefers. Thus, the input device 2216 provides the user with a simple way of choosing from a range of video applications.

The output device 2220 may be a monitor for displaying the decompressed video image signal. The storage device 2226 stores the program modules 1016, 1018 and 1020 which are loaded into the memory 2218 for access and execution by the CPU 2222. Although in the embodiment, the storage device 2226 is a hard disk, the storage device 2226 may be any device suitable for storing program modules, such as compact disk read-only memory (CD ROM), a cartridge drive or other mass storage device. The memory 2218 is addressable computer-readable memory, such as random-access memory (RAM) suitable for storing program modules during program execution.

Although the present invention has been described with reference to particular embodiments, the description is only an example of the invention's application and should not be taken as a limitation.

Various adaptations and combinations of features of the embodiments disclosed are within the scope of the present invention as defined by the following, which we claim:

1. A video-conferencing system, comprising:
  a source computer station including a device-communication circuit;
  a memory device including data corresponding to a computer-executable video-data-compression program;
  a data transfer circuit configured and arranged to carry the data corresponding to the computer-executable video-data-compression program from the memory device;
  a reconfigurable video-signal camera device having
    a first type of memory storing a plurality of computer-executable video-data-compression subprograms usable in compressing video-data,
    a second type of memory,
    a download circuit including receiver interface circuitry configured to receive the transmitted data corresponding to the computer-executable video-data-compression program and to store the transmitted data in the second memory,
    an image reader including a data generation circuit which captures an external image and generates data representing the image,
    a processor circuit, including a programmable RISC-type processor and a programmable DSP-type processor communicatively coupled to the programmable RISC-type processor, configured and arranged to execute the data corresponding to the computer-executable video-data compression program and the selected ones of the stored subprograms and to generate compressed data representing the external image, and a data transmission circuit, responsive to the processor means, for transmitting the compressed data from the reconfigurable video-signal camera device; and an interface link communicatively coupled between the data transmission circuit and the device-communication circuit of the source computer station and arranged to carry the compressed data from the data transmission circuit; and a video-destination arrangement configured and arranged to be communicatively coupled to receive the compressed data and to decompress the compressed data using a video-data-decompression program that is compatible with the computer-executable video-data-compression program transmitted to the reconfigurable video-signal camera device.

2. The video-conferencing system of claim 1 wherein the first type of memory includes memory cells which are substantially smaller in size than memory cells of the second type of memory.

3. The video-conferencing system of claim 2 wherein the first type of memory includes at least one of the following: ROM, EPROM, EEPROM and flash EPROM.

4. The video-conferencing system of claim 3 wherein the second type of memory includes a volatile RAM-type memory.

5. A video-conferencing system, comprising:

a source computer station including a device-communication circuit;

a memory device including data representing a computer-executable video-data-compression program;

data transfer circuit that transmits the data representing the computer-executable video-data-compression program from the memory device;

a reconfigurable video-signal camera device having
 a first memory storing a plurality of computer-executable video-data-compression subprograms usable in compressing video-data,
 a memory receive port constructed and arranged to receive and electrically connect to the memory device for accessing the data representing a computer-executable video-data-compression program,
 an access circuit including receiver interface circuit configured to access the data representing the computer-executable video-data-compression program,
 selection means configured and arranged to execute selected ones of the stored subprograms corresponding to the data representing the computer-executable video-data-compression program,
 an image reader including a data generation circuit which captures an external image and generates data representing the image,
 processor means, responsive to the data generation circuit, for executing the data representing the computer-executable program and the selected ones of the stored subprograms to generate compressed data representing the external image, and
 a data transmission circuit, responsive to the processor means, for transmitting the compressed data from the reconfigurable video-signal camera device; and an interface link communicatively coupled between the data transmission circuit and the device-communication circuit of the source computer station and arranged to carry the compressed data from the data transmission circuit to the device-communication; and a video-destination arrangement communicatively coupled to the source computer station and including a computer configured and programmed to receive the compressed data and to decompress the compressed data using a video-data-decompression program that is compatible with the computer-executable video-data-compression program transmitted to and selected by the reconfigurable video-signal camera device.

6. A method of operating a video-conferencing system, comprising:

transmitting data representing a computer-executable video-data-compression program from a memory device to a reconfigurable video-signal camera device,
 storing a plurality of computer-executable video-data-compression subprograms in a first type of memory,
 receiving the transmitted data representing the computer-executable video-data-compression program into a download circuit including receiver interface circuitry configured and arranged to respond to an externally generated signal,
 storing the transmitted data in a second type of memory,
 selecting one of the stored subprograms corresponding to the data representing the computer-executable video-data-compression module,
 capturing an external image and generating data representing the image,
 executing the data representing the computer-executable video-data-compression program and the selected ones of the stored subprograms to generate compressed data representing the external image, and
 transmitting the compressed data from the reconfigurable video-signal camera device;

using an interface link to carry the compressed data from the data transmission circuit to the device-communication; and receiving and decompressing the compressed data at a video-destination arrangement communicatively coupled to the source computer station including a computer configured and programmed to receive the compressed data and decompress the compressed data using a video-data-decompression program that is compatible with the computer-executable video-data-compression program transmitted to and selected by the reconfigurable video-signal camera device.

7. A video-conferencing system, comprising:

a source computer station including a device-communication circuit;

a memory device including data corresponding to a computer-executable video-data-compression program;

a data transfer circuit configured and arranged to carry the data corresponding to the computer-executable video-data-compression program from the memory device;

a reconfigurable video-signal processing arrangement having
 a first memory region storing computer-executable video-data-compression code usable in compressing video-data for a plurality of different compression standards, a second memory region, a download circuit including receiver interface circuitry configured to receive the transmitted data corresponding to the computer-executable video-data-compression code and to store the transmitted data in the second memory region, a processor circuit, including a programmable multiple-purpose processor and a programmable DSP-type processor communicatively coupled to the programmable multiple-purpose processor, configured and arranged to execute the data corresponding to the computer-executable video-data compression program provided from the memory device and selected code from the compression code usable in compressing video-data for a plurality of different compression standards, and to generate compressed data, and a data transmission circuit, responsive to the processor means, for transmitting the compressed data from the reconfigurable video-signal processing arrangement; and an interface link communicatively coupled between the data transmission circuit and the device-communication circuit of the source computer station and arranged to carry the compressed data from the data transmission circuit; and a video-destination arrangement configured and arranged to be communicatively coupled to receive the compressed data and to decompress the compressed data using a video-data-compression program that is compatible with the computer-executable video-data-compression program transmitted to the reconfigurable video-signal processing arrangement.

\* \* \* \* \*

UNITED STATES PATENT AND TRADEMARK OFFICE
CERTIFICATE OF CORRECTION

PATENT NO. : 5,926,208
DATED : July 20, 1999
INVENTOR(S) : Noonen et al.

It is certified that error appears in the above-identified patent and that said Letters Patent is hereby corrected as shown below:

Col. 5, line 40: "showin" should read --shown in--.

Col. 9, line 40: "devised" should read --devices--.

Col. 20, line 31, "multiplicatons" should read --multiplications--.

Col. 22, lines 40-41, delete indentation for new paragraph.

Col.23, line 37, "data transfer" should read --a data transfer--.

Col.23, line 49, "circuit" should read --circuitry--.

Signed and Sealed this

First Day of May, 2001

*Attest:*

NICHOLAS P. GODICI

*Attesting Officer*    *Acting Director of the United States Patent and Trademark Office*